US008648022B2

(12) United States Patent
Tazaki et al.

(10) Patent No.: US 8,648,022 B2
(45) Date of Patent: Feb. 11, 2014

(54) LUBRICATING OIL FOR REFRIGERATOR AND HYDRAULIC FLUID COMPOSITION FOR REFRIGERATOR USING THE SAME

(75) Inventors: Toshinori Tazaki, Ichihara (JP); Naoko Tazaki, legal representative, Ichihara (JP); Kenji Mogami, Ichihara (JP); Hirotaka Yamazaki, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 377 days.

(21) Appl. No.: 12/395,787

(22) Filed: Mar. 2, 2009

(65) Prior Publication Data

US 2009/0186788 A1 Jul. 23, 2009

Related U.S. Application Data

(62) Division of application No. 10/332,987, filed as application No. PCT/JP01/06333 on Jul. 23, 2001, now abandoned.

(30) Foreign Application Priority Data

| Jul. 26, 2000 | (JP) | ................................. | 2000-224842 |
| Jul. 26, 2000 | (JP) | ................................. | 2000-224843 |
| Aug. 8, 2000 | (JP) | ................................. | 2000-239830 |
| Aug. 23, 2000 | (JP) | ................................. | 2000-252279 |
| Aug. 23, 2000 | (JP) | ................................. | 2000-252280 |

(51) Int. Cl.
*C10M 107/34* (2006.01)
*C10M 105/52* (2006.01)
*C10M 111/04* (2006.01)

(52) U.S. Cl.
USPC ......................................... 508/579; 508/589

(58) Field of Classification Search
USPC ...................................... 508/579, 589; 252/67
See application file for complete search history.

(56) References Cited

U.S. PATENT DOCUMENTS

| 5,514,292 A | | 5/1996 | Sato et al. |
| 5,536,881 A | * | 7/1996 | Kawaguchi et al. .......... 568/608 |
| 5,801,132 A | | 9/1998 | Kaneko et al. |
| 5,997,761 A | * | 12/1999 | Kaneko .......................... 252/68 |
| 6,193,906 B1 | | 2/2001 | Kaneko et al. |

(Continued)

FOREIGN PATENT DOCUMENTS

| DE | 299 14 502 U 1 | 12/1999 |
| EP | 0 397 037 A2 | 11/1990 |

(Continued)

OTHER PUBLICATIONS

Extended European Search Report issued Apr. 13, 2011, in European Patent Application No. 10181099.2.

(Continued)

*Primary Examiner* — Jim Goloboy
(74) *Attorney, Agent, or Firm* — Oblon, Spivak, McClelland, Maier & Neustadt, L.L.P.

(57) ABSTRACT

The present invention proposes a lubricating oil for refrigerators comprising, as the base oil, a polyester-based derivative or a polyvinyl ether derivative and a polycarbonate-based oxygenated compound; a polyoxyalkylene glycol derivative; or a polyester-based derivative or a polyvinyl ether derivative and a polyoxyalkylene glycol derivative. The lubricating oil exhibits excellent miscibility with a refrigerant having one carbon atom and no chlorine atoms and, in particular, with difluoromethane and provides a hydraulic fluid composition exhibiting excellent antiwear, lubricity and stability.

18 Claims, 2 Drawing Sheets

(56) References Cited

U.S. PATENT DOCUMENTS

| | | | |
|---|---|---|---|
| 6,251,300 B1* | 6/2001 | Takigawa et al. | 252/67 |
| 6,263,683 B1 | 7/2001 | Tazaki | |
| 6,306,803 B1 | 10/2001 | Tazaki | |
| 6,322,719 B2 | 11/2001 | Kaneko et al. | |
| 6,354,094 B2 | 3/2002 | Tazaki | |
| 6,569,496 B1 | 5/2003 | Wall et al. | |
| 6,878,677 B1 | 4/2005 | Sakanoue et al. | |

FOREIGN PATENT DOCUMENTS

| | | |
|---|---|---|
| EP | 0 499 793 A1 | 8/1992 |
| EP | 0 510633 A1 | 10/1992 |
| EP | 0 551 865 A2 | 7/1993 |
| EP | 0 551 865 A3 | 7/1993 |
| EP | 803564 | 10/1997 |
| EP | 0 861 883 A2 | 9/1998 |
| EP | 0 913 457 A2 | 5/1999 |
| EP | 0 913 457 A3 | 5/1999 |
| EP | 1 085 077 A1 | 3/2001 |
| EP | 1 234 868 A1 | 8/2002 |
| GB | 2 269 004 A | 1/1994 |
| JP | 03217495 | 9/1991 |
| JP | 5-32985 | 2/1993 |
| JP | 5-194968 | 8/1993 |
| JP | 7-11278 | 1/1995 |
| JP | 7-173477 | 7/1995 |
| JP | 9-67589 | 3/1997 |
| JP | 11-315295 | 11/1999 |
| JP | 2000-1782 | 1/2000 |
| JP | 2000-17282 | 1/2000 |
| JP | 2000-212584 | 8/2000 |
| WO | 98/37170 | 8/1998 |
| WO | 99/58628 | 11/1999 |

OTHER PUBLICATIONS

Extended Search Report issued May 20, 2011 in European Patent Application No. 10180915.0-2104.
Extended European Search Report issued Apr. 13, 2011, in Application No. / Patent No. 10180967.1-2104.
Extended European Search Report issued Apr. 15, 2011, in Application No. / Patent No. 10181139.6-2104 / 2284249.
Japanese Office Action issued Oct. 26, 2010, in Patent Application No. 2000-224842.
Japanese Office Action issued Oct. 26, 2010, in Patent Application No. 2000-252280.
Japanese Office Action issued Oct. 26, 2010, in Patent Application No. 2000-252279.
Office Action issued Jun. 5, 2013, in European Patent Application No. 01 951 970.1.
Office Action issued Jun. 10, 2013 in European Patent Application No. 10180915.0.
Office Action issued Jun. 10, 2013 in European Patent Application No. 10180967.1.
Cited brochure, "Petroleum / Petrochemical Test Guide," Koehler Instrument Company, Inc., available at: http://www.koehlerinstrument.com/literature/applications/Test-Guide.pdf , publication date unknown; cited by European Examiner on Jun. 10, 2013.

* cited by examiner

LUBRICATING OIL FOR REFRIGERATOR AND HYDRAULIC FLUID COMPOSITION FOR REFRIGERATOR USING THE SAME

This is a divisional application of U.S. application Ser. No. 10/332,987, filed Nov. 24, 2003, which is a 371 of PCT/JP01/06333 filed on Jul. 23, 2001.

TECHNICAL FIELD

The present invention relates to a lubricating oil for refrigerators and a hydraulic fluid composition for refrigerators using the lubricating oil. More particularly, the present invention relates to a lubricating oil for refrigerators which exhibits excellent miscibility with a refrigerant having one carbon atom and no chlorine atoms and, in particular, with difluoromethane. The present invention also relates to a hydraulic fluid composition for refrigerators comprising the lubricating oil for refrigerators and the refrigerant that exhibits excellent antiwear, lubricity and stability.

BACKGROUND ART

In general, refrigerators such as compression-type refrigerators comprises a compressor, a condenser, an expansion mechanism like an expansion valve, an evaporator and, where necessary, a dryer and has a structure in which a mixed fluid of a refrigerant and a lubricating oil is circulated in the closed system. In the compression-type refrigerator, in general, temperature is high in the compressor and low in the refrigerating chamber although the conditions may be different depending on the type of the apparatus and it is required, in general, that the refrigerant and the lubricating oil be circulated in the system without causing phase separation in a wide temperature range.

In general, there are two areas of phase separation between a refrigerant and a lubricating oil, i.e., at the lower temperature side and at the high temperature side. It is preferable that the maximum temperature in the area of phase separation at the low temperature side is 10° C. or lower, more preferably 5° C. or lower, still more preferably 3° C. or lower, still more preferably 0° C. or lower and most preferably −2° C. or lower. When the phase separation takes place during the operation of refrigeration, the lifetime and the efficiency of the apparatus are adversely affected to a great extent. For example, when the phase separation of the refrigerant and the lubricating oil takes place in the compressor, lubrication of moving parts deteriorates and seizure occurs to cause a great decrease in the lifetime of the apparatus. When the phase separation takes places in the evaporator, the efficiency of heat exchange decreases because of the presence of lubricating oil of high viscosity.

As the refrigerant for the compression-type refrigerators and, in particular, for air conditioners, heretofore, chlorodifluoromethane (referred to as R22, hereinafter) and a mixture of chlorodifluoromethane and chloropentafluoroethane in weight ratio of 48.8:51.2 (referred to as R502, hereinafter) have been mainly used. As the lubricating oil, various types of mineral oils and synthetic oils that satisfy the foregoing requirement have been used. However, R22 and R502 are more rigorously restricted worldwide because there is the anxiety of causing environmental pollution such as destruction of the ozonosphere present in the stratosphere. As the novel type of the refrigerant, hydrofluorocarbons such as 1,1,1,2-tetrafluoroethane, difluoromethane, pentafluoroethane and 1,1,1-trifluoroethane (occasionally referred to as R134a, R32, R125 and R143a, respectively) are attracting attention. These hydrofluorocarbons and, in particular, R134a, R32, R125 and R143a have little anxiety of causing the ozonosphere destruction and are preferable as the refrigerant for the compression-type refrigerators.

Further improvements are required from the standpoint of the energy saving and difluoromethane (R32) among the foregoing novel refrigerants is attracting attention. However, the refrigerant R32 is used at a higher pressure and a higher temperature than those of conventional refrigerants and there is the great possibility that problems arise on lubrication. It is the actual present situation that no lubricating oils exhibiting sufficient miscibility with R32 are found among the lubricating oils for refrigerants that have been examined for the use in combination with the foregoing novel refrigerants. Development of a lubricating oil exhibiting miscibility with R32 at the same level as that with R134a, R407c (a mixture of R32, R125 and R134a in the weight ratio of 23:24:52) and R410A (a mixture of R32 and R125 in the weight ratio of 50:50) has been desired.

Under the above circumstances, the present invention has an object of providing a lubricating oil for refrigerators which exhibits excellent miscibility with a refrigerant having one carbon atom and no chlorine atoms and, in particular, with difluoromethane (R32). Another object of the present invention is to provide a hydraulic fluid composition for refrigerators comprising the lubricating oil for refrigerators and the refrigerant and exhibiting excellent antiwear, lubricity and stability.

The present inventors have been studying miscibility in the presence of the refrigerant R32 regarding oxygenated compounds such as polyether compounds, examples of which include polyoxyalkylene glycol derivatives and polyvinyl ether derivatives, and polyol ester derivatives. However, these compounds do not always exhibit the sufficient miscibility with the refrigerant R32.

DISCLOSURE OF THE INVENTION

As the result of intensive studies by the present inventors to achieve the above-described object, it was found that a mixture obtained by mixing a polyvinyl ether-based derivative or a polyester-based derivative each having a specific viscosity with a specific relative amount of a polycarbonate-based oxygenated compound and, in particular, a polycarbonate compound having two or more carbonate bonds in one molecule exhibited excellent miscibility with refrigerants having one carbon atom and no chlorine atoms and, in particular, with R32 at low temperatures and it was also found that a mixture containing the compound and the refrigerant could be used as the hydraulic fluid composition for refrigerators achieving the above-described object. The present invention has been completed based on the knowledge.

As the first aspect, the present invention provides:
(A-1) A lubricating oil for refrigerators which comprises, as a base oil, (a) a polyvinyl ether-based derivative with a kinematic viscosity of 3 to 500 mm$^2$/s at 40° C. and (b) a polycarbonate-based oxygenated compound with a kinematic viscosity of 3 to 2,000 mm$^2$/s at 40° C. in an amount of 0.1% by weight or more and less than 60% by weight based on an amount of the entire base oil, wherein a temperature of phase separation at a low temperature side of a mixture comprising the lubricating oil and a refrigerant having one carbon atom and no chlorine atoms is 5° C. or lower in at least any one of the case where the lubricating oil is contained within a range of 3 to 50% by weight based on an amount of the entire mixture; and (A-2) A lubricating oil for refrigerators which comprises, as a base oil, (a) a polyester-based derivative with a kinematic viscosity of 3 to 500 mm²/s at 40° C. and (b) a polycarbonate-based oxygenated compound with a kinematic viscosity of 3 to 2,000 mm²/s at 40° C. in an amount of 0.1% by weight or more and less than 60% by weight based on an amount of the entire base oil, wherein a temperature of phase separation at a low temperature side of a mixture comprising the lubricating oil and a refrigerant having one carbon atom and no chlorine atoms is 10° C. or lower in at least any one of the case where the lubricating oil is contained within a range of 3 to 50% by weight based on an amount of the entire mixture.

In the first aspect of the present invention, it is preferable that (b) the polycarbonate-based oxygenated compound is a polycarbonate having at least two carbonate bonds in one molecule which is at least one compound selected from:

(i) compounds represented by general formula (I):

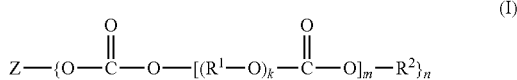

wherein Z represents a residue group obtained by eliminating hydroxyl group from an alcohol having 1 to 12 carbon atoms and a functionality of n, $R^1$ represents a linear or branched alkylene group having 2 to 10 carbon atoms, $R^2$ represents a monovalent hydrocarbon group having 1 to 12 carbon atoms or a group having ether bond represented by $R^4(O-R^3)_p-$, $R^4$ representing hydrogen atom or a monovalent hydrocarbon group having 1 to 12 carbon atoms, $R^3$ representing a linear or branched alkylene group having 2 to 10 carbon atoms and p representing an integer of 1 to 20, k represents an integer of 1 to 30, m represents an integer of 1 to 50 and n represents an integer of 1 to 6; and (ii) compounds represented by general formula (II):

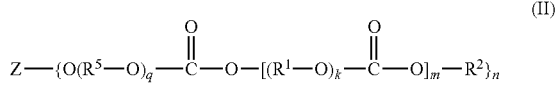

wherein $R^5$ represents a linear or branched alkylene group having 2 to 10 carbon atoms, q represents an integer of 1 to 20 and Z, $R^1$, $R^2$, k, m and n are the same as described for general formula (I).

As the result of further intensive studies by the present inventors to achieve the above-described object, it was found that a polyoxyalkylene glycol derivative having a specific viscosity and a specific substituent by itself or a mixture of the polyoxyalkylene glycol and a polyvinyl ether-based derivative having a specific viscosity or a polyester-based derivative having a specific viscosity in specific relative amounts exhibited excellent miscibility with refrigerants having one carbon atom and no chlorine atoms and, in particular, with R32 and it was also found that a mixture containing the compound or the mixture and the refrigerant could be used as the hydraulic fluid composition for refrigerators achieving the above-described objects. The second aspect of the present invention has been completed based on the knowledge.

As the second aspect, the present invention provides:

(B-1) A lubricating oil for refrigerators used for a refrigerant having one carbon atom and no chlorine atoms which comprises, as a base oil, a polyoxyalkylene glycol derivative with a kinematic viscosity of 3 to 2,000 mm²/s at 40° C. and, as a main component thereof, having at least one constituting unit represented by general formula (III):

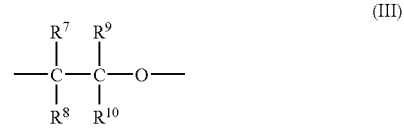

wherein $R^7$ to $R^{10}$ each independently represent hydrogen atom, a monovalent hydrocarbon group having 1 to 10 carbon atoms or a group represented by general formula (IV):

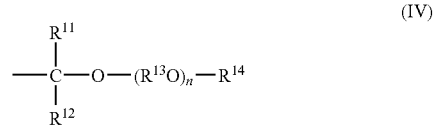

wherein $R^{11}$ and $R^{12}$ each independently representing hydrogen atom, a monovalent hydrocarbon group having 1 to 20 carbon atoms or an alkoxyalkyl group having 2 to 20 carbon atoms, $R^{13}$ representing an alkylene group having 2 to 5 carbon atoms, a substituted alkylene group having an alkyl group as a substituent and having 2 to 5 carbon atoms in an entire group or a substituted alkylene group having an alkoxyalkyl group as a substituent and having 4 to 10 carbon atoms in an entire group, $R^{14}$ representing a monovalent hydrocarbon group having 1 to 10 carbon atoms and n representing an integer of 0 to 20; and at least one of $R^7$ to $R^{10}$ represents a group represented by general formula (IV);

(B-2) A lubricating oil for refrigerators which comprises, as a base oil, (a) a polyvinyl ether-based derivative with a kinematic viscosity of 3 to 500 mm²/s at 40° C. and (b) a polyoxyalkylene glycol derivative with a kinematic viscosity of 3 to 2,000 mm²/s at 40° C. in an amount of 0.1% by weight or more and less than 60% by weight based on an amount of the entire base oil, and having at least one constituting unit represented by general formula (III); wherein a temperature of phase separation at a low temperature side of a mixture comprising the lubricating oil and a refrigerant having one carbon atom and no chlorine atoms is 5° C. or lower in at least any one of the case where the lubricating oil is contained within a range of 3 to 50% by weight based on an amount of the entire mixture; and (B-3) A lubricating oil for refrigerators which comprises, as a base oil, (a) a polyester-based derivative with a kinematic viscosity of 3 to 500 mm²/s at 40° C. and (b) a polyoxyalkylene glycol derivative with a kinematic viscosity of 3 to 2,000 mm²/s at 40° C. in an amount of 0.1% by weight or more and less than 60% by weight based on an amount of the entire base oil, having at least one constituting unit represented by general formula (III); wherein a temperature of phase separation at a low temperature side of a mixture comprising the lubricating oil and a refrigerant having one carbon atom and no chlorine atoms is 10° C. or lower in at least any one of the case where the lubricating oil is contained within a range of 3 to 50% by weight based on an amount of the entire mixture.

The present invention also provides a hydraulic fluid composition for refrigerators which comprises, as the essential components, (A) a refrigerant having one carbon atom and no chlorine atoms and (B) a lubricating oil for refrigerators according to the first aspect or the second aspect of the present invention.

It is considered that the advantageous effect of the present invention is exhibited in the following manner. The lubricating oils for refrigerators as the first aspect and the second aspect of the present invention are used in combination with a refrigerant having one carbon atom and no chlorine atoms and, in particular, with a fluorohydrocarbon-based refrigerant having no chlorine atoms. There is the tendency that the inner pressure is higher and the temperature during the use is also higher. Therefore, when the difference in the hardness between the parts constituting the metal sliding portion of the compression mechanism is set at a value greater than 10 as expressed by $H_{RC}$, where necessary, the antiwear of the part having a greater hardness is sufficiently improved while the antiwear of the part having a smaller hardness is surely kept at a current value with the hardness at the ordinary value. In this manner, antiwear of the necessary parts in the metal sliding portion can be improved and the adverse effect of the absence of the lubricating effect of chlorine atom due to the absence of chlorine atom in the fluorohydrocarbon refrigerant can be compensated. As for the tendency that the sliding part having a greater hardness accelerates wear of the sliding part having a smaller hardness, at least one compound selected from esters of orthophosphoric acid, esters of phosphorous acid and esters of acidic phosphoric acid is added to the lubricating oil as the extreme pressure agent and the insufficiency of lubricity due to the absence of chlorine atom in the fluorohydrocarbon refrigerant can be compensated by the working of the extreme pressure agent.

Figure 1:
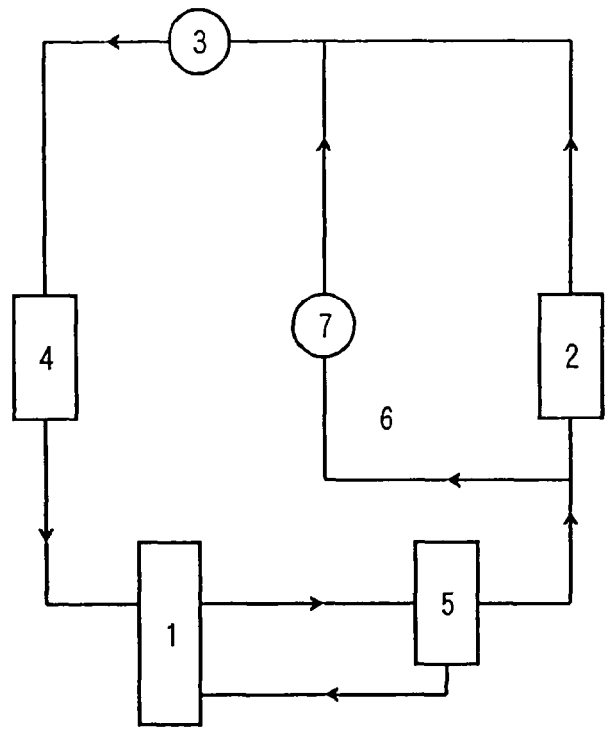
FIG. 1 shows a flow diagram that exhibits an example of the compression type refrigerating cycle of the "compressor-condenser-expansion valve-evaporator" system having an oil separator and a hot gas line.

In the Figures, numerical symbol 1 means a compressor, numerical symbol 2 means a condenser, numerical symbol 3 means an expansion valve, numerical symbol 4 means an evaporator, numerical symbol 5 means an oil separator, numerical symbol 6 means a hot gas line and numerical symbol 7 means a valve for a hot gas line.

THE MOST PREFERRED EMBODIMENT TO CARRY OUT THE INVENTION

The lubricating oil for refrigerators of the present invention will be described below.

The lubricating oil for refrigerators as the first aspect of the present invention comprises, as a base oil, (a) a polyvinyl ether-based derivative with a kinematic viscosity of 3 to 500 mm²/s at 40° C. and (b) a polycarbonate-based oxygenated compound with a kinematic viscosity of 3 to 2,000 mm²/s at 40° C. in an amount of 0.1% by weight or more and less than 60% by weight based on an amount of the entire base oil.

In a mixture comprising the lubricating oil and a refrigerant having one carbon atom and no chlorine atoms such as R32, the lubricating oil is miscible with the refrigerant (in other words, the liquid phase is homogeneous) at a temperature of 5° C. or lower in the case of the polyvinyl ether-based derivative in (A-1) and at a temperature of 10° C. or lower in the case of the polyester-based derivative (A-2) in at least any one of the case where the lubricating oil is contained within the range of 3 to 50% by weight based on the amount of the entire mixture. The content of the lubricating oil exhibiting the miscibility with the refrigerant at a temperature of 5° C. or lower or at a temperature of 10° C. or lower is within the range of 3 to 50% by weight as described above. It is preferable that the range is 10 to 15% by weight. It is more preferable that the lubricating oil is miscible with the refrigerant in the entire range of the content of 3 to 50% by weight. When the temperature exhibiting the miscibility, i.e., the temperature of phase separation at the low temperature side, exceeds 5° C. or 10° C., there is the anxiety that phase separation takes place during the operation of refrigeration. When the phase separation takes place during the operation of refrigeration, the lifetime and the efficiency of the apparatus are adversely affected to a great extent. For example, when the phase separation of the refrigerant and the lubricating oil takes place in the compressor, lubrication of moving parts deteriorates and seizure occurs to cause a great decrease in the lifetime of the apparatus. When the phase separation takes places in the evaporator, the efficiency of heat exchange decreases due to the presence of lubricating oil of high viscosity.

Based on the foregoing reasons, it is necessary that the maximum temperature in the area of phase separation at the low temperature side be 5° C. or lower for (A-1) and 10° C. or lower for (A-2). It is preferable that the maximum temperature is 3° C. or lower for (A-1) and 8° C. or lower for (A-2); more preferably 0° C. or lower and 5° C. or lower, respectively; still more preferably −2° C. or lower and 2° C. or lower, respectively; and most preferably −5° C. or lower for both of (A-1) and (A-2).

Examples of (a) the polyvinyl ether-based derivative of lubricating oil (A-1) as the first aspect of the present invention include polyvinyl ether-based compounds (1) having a constituting unit represented by general formula (V):

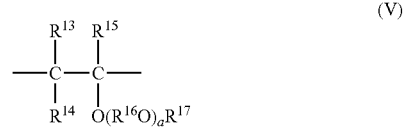

(V)

wherein $R^{13}$, $R^{14}$ and $R^{15}$ each represent hydrogen atom or a hydrocarbon group having 1 to 8 carbon atoms, the atom and the groups represented by $R^{13}$, $R^{14}$ and $R^{15}$ may be the same with or different from each other, $R^{16}$ represents a divalent hydrocarbon group having 1 to 10 carbon atoms, $R^{17}$ represents a hydrocarbon group having 1 to 20 carbon atoms, a represent numbers giving an average value of 0 to 10, the atom and the groups represented by $R^{13}$ to $R^{17}$ may be the same or different among different constituting units and, when a plurality of $R^{16}O$ are present, the plurality of $R^{16}O$ may represent the same group or different groups.

Polyvinyl ether compounds (2) comprising block or random copolymers comprising the constituting units represented by the general formula (V) and constituting units represented by the following general formula (VI):

can also be used wherein $R^{18}$ to $R^{21}$ each represent hydrogen atom or a hydrocarbon group having 1 to 20 carbon atoms that may be the same with or different from each other and the atom and the groups represented by $R^{18}$ to $R^{21}$ may be the same or different among different constituting units.

In the general formula (V), $R^{13}$, $R^{14}$ and $R^{15}$ each represent hydrogen atom or a hydrocarbon group having 1 to 8 carbon atoms and preferably 1 to 4 carbon atoms. The atom and the groups represented by $R^{13}$, $R^{14}$ and $R^{15}$ may be the same with or different from each other. Specific examples of the hydrocarbon group include alkyl groups such as methyl group, ethyl group, n-propyl group, isopropyl group, n-butyl group, isobutyl group, sec-butyl group, tert-butyl group, various types of pentyl groups, various types of hexyl groups, various types of heptyl groups and various types of octyl groups; cycloalkyl groups such as cyclopentyl group, cyclohexyl group, various types of methylcyclohexyl groups, various types of ethylcyclohexyl groups and various types of dimethylcyclohexyl groups; aryl groups such as phenyl group, various types of methylphenyl groups, various types of ethylphenyl groups and various types of dimethylphenyl groups; and arylalkyl groups such as benzyl group, various types of phenylethyl groups and various types of methylbenzyl groups. It is preferable that $R^{13}$, $R^{14}$ and $R^{15}$ represent hydrogen atom.

Next, $R^{16}$ in the general formula (V) represents a divalent hydrocarbon group having 1 to 10 carbon atoms and preferably having 2 to 10 carbon atoms. Specific examples of the divalent hydrocarbon group having 1 to 10 carbon atoms include divalent aliphatic groups such as methylene group, ethylene group, phenylethylene group, 1,2-propylene group, 2-phenyl-1,2-propylene group, 1,3-propylene group, various types of butylene groups, various types of pentylene groups, various types of hexylene groups, various types of heptylene groups, various types of octylene groups, various types of nonylene groups and various types of decylene groups; alicyclic groups having two bonding portions on alicyclic hydrocarbons such as cyclohexane, methyl-cyclohexane, ethylcyclohexane, dimethylcyclohexane and propylcyclo-hexane; divalent aromatic hydrocarbon groups such as various types of phenylene groups, various types of methylphenylene groups, various ethylphenylene groups, various types of dimethylphenylene groups and various types of naphthylene groups; alkylaromatic groups having one monovalent bonding portion on each of the alkyl portion and the aromatic portion of alkylaromatic hydrocarbons such as toluene, xylene and ethylbenzene; and alkylaromatic hydrocarbon groups having bonding portions on alkyl group portions of polyalkylaromatic hydrocarbons such as xylene and diethylbenzene. Among the examples, aliphatic groups having 2 to 4 carbon atoms are preferable.

Additionally, a in the general formula (V) represent numbers showing the repeating numbers of the group represented by $R^{16}O$ and giving an average value in the range of 0 to 10 and preferably in the range of 0 to 5. When a plurality of $R^{19}O$ are present, the plurality of $R^{16}O$ may represent the same group or different groups.

Further, $R^{17}$ in the general formula (V) represents a hydrocarbon group having 1 to 20 carbon atoms and preferably having 1 to 10 carbon atoms. Examples of the hydrocarbon group represented by $R^{17}$ include alkyl groups such as methyl group, ethyl group, n-propyl group, isopropyl group, n-butyl group, isobutyl group, sec-butyl group, tert-butyl group, various types of pentyl groups, various types of hexyl groups, various types of heptyl groups, various types of octyl groups, various types of nonyl groups and various types of decyl groups; cycloalkyl groups such as cyclopentyl group, cyclohexyl group, various types of methylcyclohexyl groups, various types of ethylcyclohexyl groups, various types of propylcyclohexyl groups and various types of dimethylcyclohexyl groups; aryl groups such as phenyl group, various types of methylphenyl groups, various types of ethylphenyl groups, various types of dimethylphenyl groups, various types of propylphenyl groups, various types of trimethylphenyl groups, various types of butylphenyl groups and various types of naphthyl groups; and arylalkyl groups such as benzyl group, various types of phenylethyl groups, various types of methylbenzyl groups, various types of phenylpropyl groups and various types of phenylbutyl groups.

The atom and the groups represented by $R^{13}$ to $R^{17}$ may be the same or different among different constituting units.

In the general formula (VI), $R^{18}$ to $R^{21}$ each represent hydrogen atom or a hydrocarbon group having 1 to 20 carbon atoms and the atom and the groups represented by $R^{18}$ to $R^{21}$ may be the same with or different from each other. Examples of the hydrocarbon group having 1 to 20 carbon atoms include the groups described above as the examples of the hydrocarbon group represented by $R^{17}$ in the general formula (V). The atom and the groups represented by $R^{18}$ to $R^{21}$ may be the same or different among different constituting units.

In lubricating oil (A-1) as the first aspect of the present invention, a mixture of the above polyvinyl ether-based compound (1) and the polyvinyl ether-based compound (2) may also be used.

Polyvinyl ether-based compounds (1) and (2) used in the present invention can be produced by polymerization of the corresponding vinyl ether monomer and copolymerization of the corresponding hydrocarbon monomer having an olefinic double bond and the corresponding vinyl ether monomer, respectively.

As the polyvinyl ether-based compound used in the aspect of the present invention, polyvinyl ether-based compounds that have one chain end with the structure represented by general formula (VII) or (VIII) are preferable:

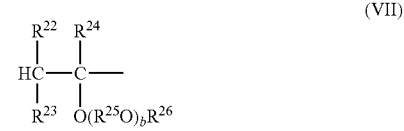

wherein $R^{22}$, $R^{23}$ and $R^{24}$ each represent hydrogen atom or a hydrocarbon group having 1 to 8 carbon atoms, the atoms and the groups represented by $R^{22}$, $R^{23}$ and $R^{24}$ may be the same with or different from each other, $R^{27}$, $R^{28}$, $R^{29}$ and $R^{30}$ each represent hydrogen atom or a hydrocarbon group having 1 to 20 carbon atom, the atoms and the groups represented by $R^{27}$, $R^{28}$, $R^{29}$ and $R^{30}$ may be the same with or different from each other, $R^{25}$ represents a divalent hydrocarbon group having 1 to 10 carbon atoms, $R^{26}$ represents a hydrocarbon group having 1 to 20 carbon atoms, b represent numbers giving an average value of 0 to 10 and, when a plurality of $R^{25}O$ are present, the plurality of $R^{25}O$ may represent the same group or different groups, and the other chain end having the structure represented by general formula (IX) or (X):

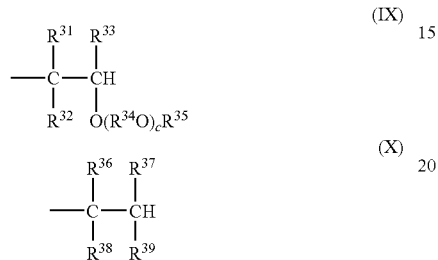

wherein $R^{31}$, $R^{32}$ and $R^{33}$ each represent hydrogen atom or a hydrocarbon group having 1 to 8 carbon atoms, the atoms and the groups represented by $R^{31}$, $R^{32}$ and $R^{33}$ may be the same with or different from each other, $R^{36}$, $R^{37}$, $R^{38}$ and $R^{39}$ each represent hydrogen atom or a hydrocarbon group having 1 to 20 carbon atom, the atoms and the groups represented by $R^{36}$, $R^{37}$, $R^{38}$ and $R^{39}$ may be the same with or different from each other, $R^{34}$ represents a divalent hydrocarbon group having 1 to 10 carbon atoms, $R^{35}$ represents a hydrocarbon group having 1 to 20 carbon atoms, c represent numbers giving an average value of 0 to 10 and, when a plurality of $R^{34}O$ are present, the plurality of $R^{34}O$ may represent the same group or different groups.

As the polyvinyl ether-based compound used in the aspect of the present invention, polyvinyl ether-based compounds that have one chain end with the structure represented the general formula (VII) or (VIII) and the other chain end having the structure represented by general formula (XI) are also preferable:

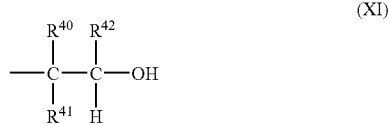

wherein $R^{40}$, $R^{41}$ and $R^{42}$ each represent hydrogen atom or a hydrocarbon group having 1 to 8 carbon atoms and the atoms and the groups represented by $R^{40}$, $R^{41}$ and $R^{42}$ may be the same with or different from each other.

Among the above polyvinyl ether-based compounds, the following compounds are preferable for lubricating oil (A-1) as the first aspect of the present invention:

(1) Compounds which have one chain end having the structure represented by general formula (VII) or (VIII) and the other chain end having the structure represented by general formula (IX) or (X) and comprise the structural unit represented by general formula (V) in which $R^{13}$, $R^{14}$ and $R^{15}$ each represent hydrogen atoms, a represents numbers of 0 to 4, $R^{16}$ represents a divalent hydrocarbon group having 2 to 4 carbon atoms and $R^{17}$ represents a hydrocarbon group having 1 to 20 carbon atoms;

(2) Compounds which comprise the structural unit represented by general formula (V) alone and have one chain end having the structure represented by general formula (VII) and the other chain end having the structure represented by general formula (IX), wherein $R^{13}$, $R^{14}$ and $R^{15}$ in general formula (V) each represent hydrogen atom, a represents numbers of 0 to 4, $R^{16}$ represents a divalent hydrocarbon group having 2 to 4 carbon atoms and $R^{17}$ represents a hydrocarbon group having 1 to 20 carbon atoms;

(3) Compounds which have one chain end having the structure represented by general formula (VII) or (VIII) and the other chain end having the structure represented by general formula (XI) or (X) and comprise the structural unit represented by general formula (V) in which $R^{13}$, $R^{14}$ and $R^{15}$ each represent hydrogen atom, a represents numbers of 0 to 4, $R^{16}$ represents a divalent hydrocarbon group having 2 to 4 carbon atoms and $R^{17}$ represents a hydrocarbon group having 1 to 20 carbon atoms;

(4) Compounds which comprise the structural unit represented by general formula (V) alone and have one chain end having the structure represented by general formula (VII) and the other chain end having the structure represented by general formula (X), wherein $R^{13}$, $R^{14}$ and $R^{15}$ in general formula (V) each represent hydrogen atom, a represents numbers of 0 to 4, $R^{16}$ represents a divalent hydrocarbon group having 2 to 4 carbon atoms and $R^{17}$ represents a hydrocarbon group having 1 to 20 carbon atoms; and (5) mixtures of the compounds (1) to (4).

In lubricating oil (A-1) as the first aspect of the present invention, polyvinyl ether-based compounds which comprise the structural unit represented by the general formula (V) and have one chain end having the structure represented by the general formula (VII) and the other chain end having the structure represented by the following general formula (XIII):

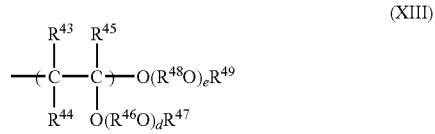

wherein $R^{43}$, $R^{44}$ and $R^{45}$ each represent hydrogen atom or a hydrocarbon group having 1 to 8 carbon atoms and the atoms and the groups represented by $R^{43}$, $R^{44}$ and $R^{45}$ may be the same with or different from each other; $R^{46}$ and $R^{48}$ each represent a divalent hydrocarbon group having 2 to 10 carbon atoms and may represent the same group or different groups; $R^{47}$ and $R^{49}$ each represent a hydrocarbon group having 1 to 10 carbon atoms and may represent the same group or different groups; d and e each represent numbers giving an average value of 0 to 10 and may represent the same number or different numbers; when a plurality of $R^{46}O$ are present, the plurality of $R^{46}O$ may represent the same group or different groups; and, when a plurality of $R^{48}O$ are present, the plurality of $R^{48}O$ may represent the same group or different groups can also be used.

Further, in lubricating oil (A-1) as the first aspect of the present invention, polyvinyl ether-based compounds which are homopolymers and copolymers of alkyl vinyl ethers comprising structural units represented by the following general formula (XIV) or (XV):

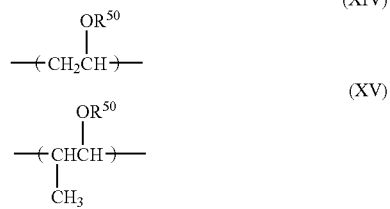

wherein $R^{50}$ represents a hydrocarbon group having 1 to 8 carbon atoms; and having a weight-average molecular weight of 300 to 5,000 and one chain end having the structure represented by the following general formula (XVI) or (XVII):

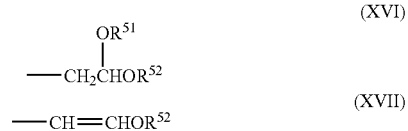

wherein $R^{51}$ represents an alkyl group having 1 to 8 carbon atoms and $R^{52}$ represents a hydrocarbon group having 1 to 8 carbon atoms; can also be used.

Further examples of the polyvinyl ether-based derivative described above include the compounds described in detail in Japanese Patent Application Laid-Open Nos. Heisei 6(1994)-128578, Heisei 6(1994)-234814, Heisei 6(1994)-234815 and Heisei 8(1996)-193196.

The (a) polyvinyl ether-based derivative in lubricating oil (A-1) as the first aspect of the present invention has a kinematic viscosity at 40° C. in the range of 3 to 500 mm²/s, preferably in the range of 5 to 200 mm²/s and more preferably in the range of 5 to 150 mm²/s.

Examples of (a) the polyester-based derivative of the base oil in lubricating oils for refrigerators (A-2) as the first aspect and in lubricating oil for refrigerators (B-3) as the second aspect of the present invention include aromatic esters, esters of dibasic acids, polyol esters, complex esters, esters of carbonic acid and mixtures of these esters.

As the aromatic ester, esters obtained from aromatic carboxylic acids having a functionality, in general, in the range of 2 to 6, preferably in the range of 2 to 4 and more preferably of 2 or 3 and aliphatic alcohols having, in general, 1 to 18 carbon atoms and preferably 1 to 12 carbon atoms are used. Examples of the aromatic carboxylic acid having a functionality of 2 to 6 include phthalic acid, isophthalic acid, terephthalic acid, trimellitic acid, pyromellitic acid and mixtures of these acids. The aliphatic alcohol having 1 to 18 carbon atom may be a linear alcohol or a branched alcohol. Examples of such an alcohol include methanol, ethanol, linear and branched propanols, linear and branched butanols, linear and branched pentanols, linear and branched hexanols, linear and branched heptanols, linear and branched octanols, linear and branched nonanols, linear and branched decanols, linear and branched undecanols, linear and branched dodecanols, linear and branched tridecanols, linear and branched tetradecanols, linear and branched pentadecanols, linear and branched hexadecanols, linear and branched heptadecanols, linear and branched octadecanols and mixtures of these alcohols.

Examples of the aromatic ester include dibutyl phthalate, di(2-ethylhexyl) phthalate, dinonyl phthalate, didecyl phthalate, didodecyl phthalate, ditridecyl phthalate, trisbutyl trimellitate, tris(2-ethylhexyl) trimellitate, trisnonyl trimellitate, trisdecyl trimellitate, trisdodecyl trimellitate and tristridecyl trimellitate. When a carboxylic acid having a functionality of two or greater is used, naturally, the ester may be a simple ester obtained from a single type of aliphatic alcohol or a complex ester obtained from two or more types of aliphatic alcohols.

As the ester of a dibasic acid, esters of dibasic acids having 5 to 10 carbon atoms such as glutaric acid, adipic acid, pimellic acid, suberic acid, azelaic acid and sebacic acid with monohydric alcohols having 1 to 15 carbon atoms and linear and branched alkyl groups such as methanol, ethanol, propanol, butanol, pentanol, hexanol, heptanol, octanol, nonanol, decanol, undecanol, dodecanol, tridecanol, tetradecanol and pentadecanol and mixtures of these esters are preferable. Specific examples of the ester include ditridecyl glutarate, di-2-ethylhexyl adipate, diisodecyl adipate, ditridecyl adipate, di-2-ethylhexyl sebacate and mixtures of these esters.

As the polyol ester, esters of diols and polyols having 3 to 20 hydroxyl groups with fatty acids having 6 to 20 carbon atoms are preferable. Examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol and 1,12-dodecanediol. Examples of the polyol include polyhydric alcohols such as trimethylolethane, trimethylolpropane, trimethylolbutane, di(trimethylolpropane), tri(trimethylolpropane), pentaerythritol, di(pentaerythritol), tri(pentaerythritol), glycerol, polyglycerols (2- to 20-mers of glycerol), 1,3,5-pentanetriol, sorbitol, sorbitane, condensates of sorbitol and glycerol, adonitol, arabitol, xylitol and mannitol; sugars such as xylose, arabinose, ribose, rhamnose, glucose, fructose, galactose, mannose, sorbose, cellobiose, maltose, isomaltose, trehalose, sucrose, raffinose, gentianose and melezitose; partial esterification products of these compounds; and methyl glucosides. Among these compounds, hindered alcohols such as neopentyl glycol, trimethylolethane, trimethylolpropane, trimethylolbutane, di(trimethylol)propane, tri(trimethylolpropane), pentaerythritol, di(pentaerythritol) and tri(pentaerythritol) are preferable as the polyol.

The number of carbon atoms in the fatty acid is not particularly limited. In general, fatty acids having 1 to 24 carbon atoms are used. Among the fatty acids having 1 to 24 carbon atoms, fatty acids having 3 or more carbon atoms are preferable, fatty acids having 4 or more carbon atoms are more preferable, fatty acids having 5 or more are still more preferable, and fatty acids having 5 to 9 carbon atoms are most preferable from the standpoint of the lubricity. From the standpoint of the miscibility with the refrigerant, fatty acids having 18 or less carbon atoms are preferable, fatty acids having 12 or less carbon atoms are more preferable and fatty acids having 9 or less carbon atoms are most preferable.

Any of linear fatty acids and branched fatty acids can be used. From the standpoint of the lubricity, linear fatty acids are preferable. From the standpoint of the stability to hydrolysis, branched fatty acids are preferable. Any of saturated fatty acids and unsaturated fatty acids can be used.

Examples of the fatty acid include pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid and oleic acid, which may be linear, branched or so-called neo-acids having a quaternary α-carbon atom. Specifically, valeric acid (n-pentanoic acid), caproic acid (n-hexanoic acid), enanthoic acid (n-heptanoic acid), caprylic acid (n-octanoic acid), peralgonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid and 3,5,5-trimethylhexanoic acid are preferable.

The polyol ester may be a partial ester in which a portion of hydroxyl groups are remaining without being esterified, a complete ester in which the entire hydroxyl groups are esterified or a mixture of a partial ester and a complete ester. It is preferable that the polyol ester is a complete ester.

The complex ester is an ester obtained from a combination of a monobasic acid and a dibasic acid and a combination of a monohydric alcohol and a polyol. As the fatty acid, the dibasic acid, the monohydric alcohol and the polyol, the compounds described above as the examples of the corresponding compounds for the esters of dibasic acids and polyol esters can be used.

The ester used in the present invention may be, naturally, a single ester having a single structure or a mixture of two or more types of esters having different structures.

Among the above various esters, polyol esters and complex esters are preferable due to the excellent miscibility with the refrigerant.

Among the polyester polyols, due to the more excellent stability to hydrolysis, esters of hindered alcohols such as neopentyl glycol, trimethylolethane, trimethylolpropane, trimethylolbutane, di(trimethylol-propane), tri(trimethylolpropane), pentaerythritol, di(pentaerythritol) and tri(pentaerythritol) are more preferable and esters of neopentyl glycol, trimethylolethane, trimethylolpropane, trimethylolbutane and pentaerythritol are still more preferable. Esters of pentaerythritol and trimethylolpropane are most preferable due to the remarkably excellent miscibility with the refrigerant and stability to hydrolysis.

Specific examples of the polyol ester include diesters of neopentyl glycol with one or more types of fatty acids selected from valeric acid, caproic acid, enanthoic acid, caprylic acid, peralgonic acid, capric acid, oleic acid, isopentanoic acid, 2-methylhexanoic acid, 2-ethylpentanoic acid, 2-ethylhexanoic acid and 3,5,5-trimethylhexanoic acid; triesters of trimethylolethane with one or more fatty acids selected from valeric acid, caproic acid, enanthoic acid, caprylic acid, peralgonic acid, capric acid, oleic acid, isopentanoic acid, 2-methylhexanoic acid, 2-ethylpentanoic acid, 2-ethylhexanoic acid and 3,5,5-trimethylhexanoic acid; triesters of trimethylolpropane with one or more fatty acids selected from valeric acid, caproic acid, enanthoic acid, caprylic acid, peralgonic acid, capric acid, oleic acid, isopentanoic acid, 2-methylhexanoic acid, 2-ethylpentanoic acid, 2-ethylhexanoic acid and 3,5,5-trimethylhexanoic acid; triesters of trimethylolbutane with one or more fatty acids selected from valeric acid, caproic acid, enanthoic acid, caprylic acid, peralgonic acid, capric acid, oleic acid, isopentanoic acid, 2-methylhexanoic acid, 2-ethylpentanoic acid, 2-ethylhexanoic acid and 3,5,5-trimethylhexanoic acid; and tetraesters of pentaerythritol with one or more fatty acids selected from valeric acid, caproic acid, enanthoic acid, caprylic acid, peralgonic acid, capric acid, oleic acid, isopentanoic acid, 2-methylhexanoic acid, 2-ethylpentanoic acid, 2-ethylhexanoic acid and 3,5,5-trimethylhexanoic acid.

The ester of two or more types of fatty acids may be a mixture of two or more types of esters each obtained from a single fatty acid and a polyol or esters of a mixture of two or more types of fatty acids and a polyol. The esters of a mixture of two or more types of fatty acids and a polyol are preferable due to the excellent properties at low temperatures and miscibility with the refrigerant.

As esters other than those described above, esters disclosed in Japanese Patent Application Laid-Open Nos. Heisei 4(1992)-183788, 5(1993)-17792, 8(1996)-226717, 8(1996)-231972, 8(1996)-240352, 8(1996)-240362, 8(1996)-253779 and 8(1996)-259975 are preferable.

The (a) polyester-based derivative has a kinematic viscosity at 40° C. in the range of 3 to 500 mm$^2$/s, preferably in the range of 5 to 300 mm$^2$/s and more preferably in the range of 8 to 150 mm$^2$/s.

It is preferable that (b) the polycarbonate-based oxygenated compound used as the base oil in lubricating oils (A-1) and (A-2) as the first aspect of the present invention is a polycarbonate having at least two carbonate bonds in one molecule, which is at least one compound selected from:

(i) compounds represented by general formula (I):

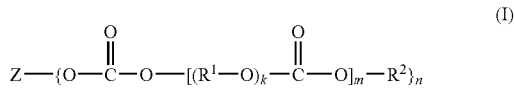

wherein Z represents a residue group obtained by eliminating hydroxyl group from an alcohol having 1 to 12 carbon atoms and a functionality of n, $R^1$ represents a linear or branched alkylene group having 2 to 10 carbon atoms, $R^2$ represents a monovalent hydrocarbon group having 1 to 12 carbon atoms or a group having ether bond represented by $R^4(O\!\!-\!\!R^3)_p\!\!-\!\!$, $R^4$ representing hydrogen atom or a monovalent hydrocarbon group having 1 to 12 carbon atoms, $R^3$ representing a linear or branched alkylene group having 2 to 10 carbon atoms and p representing an integer of 1 to 20, k represents an integer of 1 to 30, m represents an integer of 1 to 50 and n represents an integer of 1 to 6; and (ii) compounds represented by general formula (II):

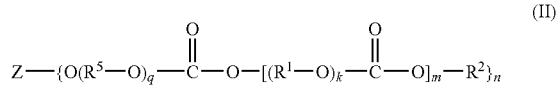

wherein $R^5$ represents a linear or branched alkylene group having 2 to 10 carbon atoms, q represents an integer of 1 to 20 and Z, $R^1$, $R^2$, k, m and n are as described for the general formula (I).

In the general formulae (I) and (II), Z represents a residue group obtained by eliminating hydroxyl group from an alcohol having 1 to 12 carbon atoms and a functionality of 1 to 6. It is preferable that Z represents a residue group obtained by eliminating hydroxyl group from a monohydric alcohol having 1 to 12 carbon atoms.

Examples of the alcohol having 1 to 12 carbon atoms and a functionality of 1 to 6 from which the residue group represented by Z is derived include the following alcohols. Examples of the monohydric alcohol include aliphatic monohydric alcohols such as methyl alcohol, ethyl alcohol, n-propyl alcohol, isopropyl alcohol, various types of butyl alcohol, various types of pentyl alcohol, various types of hexyl alcohol, various types of octyl alcohol, various types of decyl alcohol and various types of dodecyl alcohol; alicyclic monohydric alcohols such as cyclopentyl alcohol and cyclohexyl alcohol; aromatic alcohols such as phenol, cresol, xylenol, butylphenol and naphthol; and aromatic aliphatic alcohols such as benzyl alcohol and phenetyl alcohol. Examples of the dihydric alcohol include aliphatic alcohols such as ethylene glycol, propylene glycol, butylene glycol, neopentylene glycol and tetramethylene glycol; alicyclic alcohols such as cyclohexanediol and cyclohexanedimethaonol; aromatic alcohols such as catechol, resorcinol, hydroquinone and dihydroxydiphenyl. Examples of the trihydric alcohol include aliphatic alcohols such as glycerol, trimethylolpropane, trimethylolethane, trimethylolbutane and 1,3,5-pentanetriol; alicyclic alcohols such as cyclohexanetriol and cyclohexanetrimethanol; and aromatic alcohols such as pyrogallol and methyl-pyrogallol. Examples of the alcohol having a functionality of 4 to 6 include pentaerythritol, digylcerol, triglycerol, sorbitol and dipentaerythritol.

The compound represented by general formula (I) as the example of the polycarbonate compound can be compounds represented by general formula (I-a):

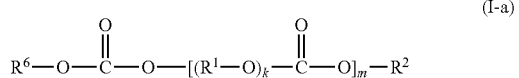

(I-a)

wherein $R^6$ represents a residue group obtained by eliminating hydroxyl group from a monohydric alcohol having 1 to 12 carbon atoms and $R^1$, $R^2$, k and m are as described for general formula (I). The compound represented by general formula (II) as the example of the polycarbonate compound can be represented by general formula (II-a):

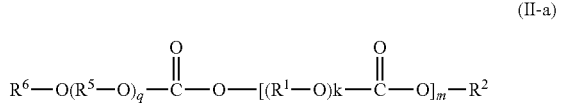

(II-a)

wherein $R^1$, $R^2$, $R^5$, $R^6$, k, m and q are as described for general formulae (I), (II) and (I-a).

In the general formula (I-a) and the general formula (II-a), examples of the residue group represented by $R^6$ which is obtained by eliminating hydroxyl group from a monohydric alcohol having 1 to 12 carbon atoms include aliphatic hydrocarbon groups such as methyl group, ethyl group, n-propyl group, isopropyl group, various types of butyl group, various types of pentyl group, various types of hexyl group, various types of octyl group, various types of decyl group and various types of dodecyl group; alicyclic hydrocarbon groups such as cyclopentyl group, cyclohexyl group, methylcyclohexyl group, dimethylcyclohexyl group and decahydronaphthyl group; aromatic hydrocarbon groups such as phenyl group, various types of tolyl group, various types of xylyl group, mesityl group and various types of naphthyl group; and aromatic aliphatic hydrocarbon groups such as benzyl group, methylbenzyl group, phenetyl group and various types of naphthylmethyl group. Among these groups, linear and branched alkyl groups having 1 to 6 carbon atoms are preferable.

$R^1$ represents a linear or branched alkylene groups having 2 to 10 carbon atoms, preferably a linear or branched alkylene group having 2 to 6 carbon atoms and more preferably ethylene group or propylene group from the standpoint of the properties and the easiness of production. $R^2$ represents a monovalent hydrocarbon group having 1 to 12 carbon atoms or a group having ether bond represented by $R^4(O-R^3)_p-$, wherein $R^4$ represents hydrogen atom or a monovalent hydrocarbon group having 1 to 12 carbon atoms and preferably 1 to 6 carbon atoms, $R^3$ represents a linear or branched alkylene group having 2 to 10 carbon atoms and p represents an integer of 1 to 10. Examples of the monovalent hydrocarbon group having 1 to 12 carbon atoms described above include the groups described as the examples of the group represented by $R^6$. As the linear or branched alkylene group having 2 to 10 carbon atoms which is represented by $R^3$, linear and branched alkylene groups having 2 to 6 carbon atoms are preferable and ethylene group and propylene group are more preferable from the same standpoint as that described above for $R^1$.

As the group represented by $R^2$, linear and branched alkyl groups having 1 to 6 carbon atoms are preferable.

As the linear or branched alkylene group having 2 to 10 carbon atoms which is represented by $R^5$ in general formula (II-a), linear and branched alkylene groups having 2 to 6 carbon atoms are preferable and ethylene group and propylene groups are more preferable from the same standpoint as that described above for $R^1$.

The above polycarbonate compound can be produced in accordance with various processes. In general, the aimed polycarbonate compound can be produced by reacting a diester of carbonic acid or a derivative forming an ester of carbonic acid such as phosgene with an alkylene glycol or a polyoxyalkylene glycol in accordance with a conventional process.

The lubricating oil as the first aspect of the present invention may comprise a single type or a plurality of types of the polycarbonate compound represented by general formula (I) and may comprise a single type or a plurality of types of the polycarbonate compound represented by general formula (II). The lubricating oil may comprise one or more type of the polycarbonate compound represented by general formula (I) and one or more types of the polycarbonate compound represented by general formula (II). The lubricating oil may further comprise oxygenated compounds such as polyether compounds, examples of which include polyoxyalkylene glycol derivatives and polyvinyl ether derivatives, and polyester derivatives in combination with the polycarbonate compound described above as long as the object of the present invention is not adversely affected.

The (b) polycarbonate compound has a kinematic viscosity at 40° C. in the range of 3 to 2,000 mm$^2$/s, preferably in the range of 5 to 1,500 mm$^2$/s and more preferably in the range of 10 to 1,000 mm$^2$/s.

The lubricating oil for refrigerators as the first aspect of the present invention comprises, as the base oil, (a) the foregoing polyvinyl ether-based derivative in lubricating oil (A-1) or the foregoing polyester-based derivative in lubricating oil (A-2) and (b) the foregoing polycarbonate-based oxygenated compound in an amount of 0.1% by weight or more and less than 60% by weight, preferably 0.5 to 55% by weight and more preferably 1.0 to 50% by weight, based on the amount of the entire base oil. The base oil may further comprise polyoxyalkylene glycol, polyesters such as polyol esters, esters of carbonic acid and hydrocarbons such as poly-α-olefins in addition to the above components.

It is preferable that the lubricating oil for refrigerators as the first aspect of the present invention has a kinematic viscosity at 40° C. in the range of 7 to 200 mm$^2$/s and more preferably in the range of 8 to 150 mm$^2$/s and a viscosity index of 40 or greater, more preferably in the range of 50 to 130 and still more preferably in the range of 60 to 120.

Lubricating oil for refrigerators (B-1) as the second aspect of the present invention is used for refrigerators using a refrigerant having one carbon atom and no chlorine atoms and contains a base oil which comprises as a main component thereof a polyoxyalkylene glycol derivative with a kinematic viscosity of 3 to 2,000 mm²/s at 40° C. and having at least one constituting unit represented by the general formula (III):

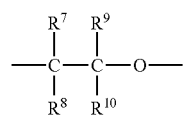
(III)

In the general formula (III), $R^7$ to $R^{10}$ each independently represents hydrogen atom, a monovalent hydrocarbon group having 1 to 10 carbon atoms or a group represented by the general formula (IV):

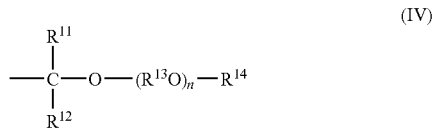
(IV)

The monovalent hydrocarbon group having 1 to 10 carbon atoms which is represented by $R^7$ to $R^{10}$ is, in general, an alkyl group having 1 to 10 carbon atoms, an alkenyl group having 2 to 10 carbon atoms, a cycloalkyl group having 5 to 10 carbon atoms, an aryl group having 6 to 10 carbon atoms or an aralkyl group having 7 to 10 carbon atoms. Specific examples of the monovalent hydrocarbon group include alkyl groups such as methyl group, ethyl group, n-propyl group, isopropyl group, various types of butyl group, various types of pentyl group, various types of hexyl group, various types of heptyl group, various types of octyl group, various types of nonyl group and various types of decyl group; alkenyl groups such as vinyl group, allyl group, propenyl group, isopropenyl group, various types of butenyl group, various types of pentenyl group, various types of hexenyl group, various types of heptenyl group, various types of octenyl group, various types of nonenyl group and various types of decenyl group; cycloalkyl groups such as cyclopentyl group and cyclohexyl group; aryl groups such as phenyl group, various types of tolyl group, various types of xylyl group and naphthyl group; and aralkyl groups such as benzyl group, 1-phenylethyl group and 2-phenylethyl group. Among these groups, monovalent hydrocarbon groups having 6 or less carbon atoms are preferable and alkyl groups having 3 or less carbon atoms are more preferable.

In the general formula (IV), $R^{11}$ and $R^{12}$ each independently represent hydrogen atom, a monovalent hydrocarbon group having 1 to 20 carbon atoms or an alkoxyalkyl group having 2 to 20 carbon atoms. As the monovalent hydrocarbon group having 1 to 20 carbon atoms, monovalent hydrocarbon groups having 1 to 10 carbon atoms are preferable. Examples of the monovalent hydrocarbon groups having 1 to 10 carbon atoms include the groups described as the examples of the monovalent hydrocarbon groups having 1 to 10 carbon atoms represented by $R^7$ to $R^{10}$. As the monovalent hydrocarbon group, monovalent hydrocarbon groups having 6 or less carbon atoms are preferable and alkyl groups having 3 or less carbon atoms are more preferable. Examples of the alkoxyalkyl group having 2 to 20 carbon atoms include methoxymethyl group, ethoxymethyl group, n-propoxymethyl group, isopropoxymethyl group, various types of butoxymethyl groups, various types of pentoxymethyl groups, various types of hexoxymethyl groups, various types of heptoxymethyl groups, various types of octoxymethyl groups, various types of nonyloxymethyl groups, 1-methoxyethyl group, 2-methoxyethyl group, 1-ethoxyethyl group, 2-ethoxyethyl group, various types of propoxyethyl groups, various types of butoxyethyl groups, various types of pentoxyethyl groups, various types of hexoxyethyl groups, various types of heptoxyethyl groups, various types of octoxyethyl groups, various types of methoxypropyl groups, various types of ethoxypropyl groups, various types of propoxypropyl groups, various types of butoxypropyl groups, various types of pentoxypropyl groups, various types of hexoxypropyl groups, various types of heptoxypropyl groups, various types of methoxybutyl groups, various types of ethoxybutyl groups, various types of pentoxybutyl groups, various types of hexoxybutyl groups, various types of methoxypentyl groups, various types of ethoxypentyl groups, various types of propoxypentyl groups, various types of butoxypentyl groups, various types pentoxypentyl groups, various types of methoxyhexyl groups, various types of ethoxyhexyl groups, various types of propoxyhexyl groups, various types of butoxyhexyl groups, various types of methoxyheptyl groups, various types of ethoxyheptyl groups, various types of propoxyheptyl groups, various types of methoxyoctyl groups, various types of ethoxyoctyl groups and various types of methoxynonyl groups. Among these groups, alkoxyalkyl groups having 6 or less carbon atoms are preferable.

Next, $R^{13}$ represents an alkylene group having 2 to 5 carbon atoms, a substituted alkylene group having an alkyl group as a substituent and 2 to 5 carbon atoms in the entire group or a substituted alkylene group having an alkoxyalkyl group as a substituent and 4 to 10 carbon atoms in the entire group.

Examples of the alkylene group include ethylene group, 1-methylethylene group, ethylethylene group, 1,1-dimethylethylene group, 1,2-dimethylethylene group, n-propylethylene group, isopropylethylene group, 1-ethyl-2-methylethylene group, 1-ethyl-1-methylethylene group, trimethylene group, tetramethylene group, pentamethylene group, (methoxymethyl)ethylene group, (ethoxymethyl)ethylene group, (methoxyethyl)ethylene group, 1-methoxymethyl-2-methylethylene group, 1,2-(bismethoxymethyl)ethylene group, 1,1-(bismethoxymethyl)ethylene group, (ethoxyethyl)ethylene group, 1,2-(bisethoxyethyl)ethylene group and 2-methoxy-1,3-propylene group. Ethylene group and substituted ethylene groups having 6 or less carbon atoms are preferable. $R^{14}$ represents a monovalent hydrocarbon group having 1 to 10 carbon atoms. Examples of the group represented by $R^{14}$ include the groups described as the examples of the monovalent hydrocarbon groups having 1 to 10 carbon atoms which are represented by $R^7$ to $R^9$. As the group represented by $R^{14}$, hydrocarbon groups having 6 or less carbon atoms are preferable and alkyl groups having 3 or less carbon atoms are more preferable. n represents an integer of 0 to 20.

The atoms or groups represented by $R^7$ to $R^9$ may be the same with or different from each other. At least one of $R^7$ to $R^9$ represents a group represented by the general formula (IV). In particular, it is preferable that one of $R^7$ and $R^9$ represents a group represented by the general formula (IV) and the other of $R^7$ and $R^9$, $R^8$ and $R^{10}$ each represent hydrogen atom or a monovalent hydrocarbon group having 1 to 10 carbon atoms.

In lubricating oil for refrigerators (B-1) as the second aspect of the present invention, the polyoxyalkylene glycol derivative used as the main component of the base oil comprises at least one constituting unit represented by the general formula (III). The polyalkylene glycol derivatives can be divided into the following three types of compounds: homopolymers comprising a single type of the constituting unit represented by the general formula (III); copolymers comprising two or more types of the constituting units represented by the general formula (III); and copolymers comprising the constituting units represented by the general formula (III) and other constituting units such as constituting units represented by general formula (XVIII):

(XVIII)

wherein $R^{63}$ to $R^{66}$ each represent hydrogen atom or an alkyl group having 1 to 3 carbon atoms.

Preferable examples of the homopolymer described above include homopolymers comprising 1 to 200 constituting units A represented by the general formula (III) and having hydroxyl group, an acyloxyl group having 1 to 10 carbon atoms, an alkoxyl group having 1 to 10 carbon atoms or an aryloxyl group at each chain end.

Preferable examples of the copolymer include copolymers which comprise two types of constituting units A and B each represented by the general formula (III) each in a number of 1 to 200 and copolymers which comprise 1 to 200 constituting units A represented by general formula (III) and 1 to 200 constituting units C represented by general formula (XVIII), each copolymer having hydroxyl group, an acyloxyl group having 1 to 10 carbon atoms, an alkoxyl group having 1 to 10 carbon atoms or an aryloxyl groups at each chain end.

The above copolymers include alternating copolymers, random copolymers and block copolymers comprising constituting units A and constituting units B (or constituting units C) and graft copolymers comprising the main chain comprising constituting units A to which constituting units B are grafted.

The above polyoxyalkylene glycol derivative used as the main component in lubricating oil for refrigerators (B-1) as the second aspect of the present invention can be prepared, for example, in accordance with the following process.

(X) Process

The polyoxyalkylene glycol derivative can be obtained by homopolymerization of an oxirane compound represented by general formula (XIX):

(XIX)

wherein $R^7$ to $R^{10}$ are the same as those described above, or copolymerization of two or more types of the above oxirane compound.

The polyoxyalkylene glycol derivative can be produced also by copolymerization of the oxirane compound represented by the above general formula (XIX) and an alkylene oxide having 2 to 8 carbon atoms which is represented by general formula (XX):

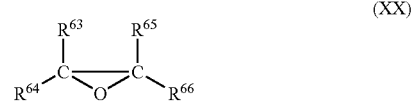

(XX)

wherein $R^{63}$ to $R^{66}$ are the same as those described above; such as ethylene oxide and propylene oxide.

The oxirane compound represented by general formula (XIX) include various compounds since $R^7$ to $R^{10}$ represent various atom and groups. Examples of the oxirane compound include glycidyl methyl ether, ethyl glycidyl ether, propyl glycidyl ether, butyl glycidyl ether, 2-ethylhexyl glycidyl ether, 2-methyloctyl glycidyl ether, vinyl glycidyl ether, allyl glycidyl ether, phenyl glycidyl ether, sec-butylphenyl glycidyl ether, 4,7-dioxa-1,2-epoxyoctane, 1,2-epoxy-4,7,10-trioxatetradecane, 1,2-epoxy-4,7,10,13-tetraoxatetradecane, 4,7-dioxa-1,2-epoxy-5-methyloctane, 4,7-dioxa-1,2-epoxy-6-methyloctane, 6,9-dimethyl-1,2-epoxy-4,7,10-trioxa-undecane, 1,2-epxoy-4,7,10,13-tetraoxa-6,9,12-trimethyltetradecane, 1,2-epoxy-5-methyl-4,7,10-trioxaundecane, 1,2-epoxy-8-methyl-4,7,10-trioxa-undecane, 2,7-dioxa-4,5-epoxyoctane, 4,5-epoxy-9-methyl-2,7,10-trioxa-undecane, 4,5-epoxy-2,7,10,13-tetraoxatetradecane, 7,8-epoxy-2,5,10,13-tetraoxatetradecane, 3,12-dimethyl-7,8-epoxy-2,5,10,13-tetraoxatetra-decane, 1,2-epoxy-3-methoxy-5-oxahexane, 4,8-dioxa-1,2-epoxy-6-methoxy-nonane, 4,7-dioxa-1,2-epoxy-5-(2-oxapropyl)octane, 3,5-bis(2-oxapropyl)-4,7-dioxa-1,2-epoxyoctane, 3,6-bis(2-oxapropyl)-4,7-dioxa-1,2-epoxyoctane and 6,9-bis(2-oxapropyl)-1,2-epoxy-4,7,10-trioxaundecane.

As the initiator of the polymerization, conventional compounds such as water, alkali hydroxides, alcohols having a functionality of 1 to 6, alkoxides, thiols, 2,2'-thiodiethanol, sodium alkoxides of 2,2'-thiodiethanol, phenol, phenoxides and amines can be used.

(Y) Process

The aimed polyoxyalkylene glycol derivative can be produced by polymerization of at least one homopolymer of the oxirane compound represented by general formula (XIV) which is obtained in accordance with (X) process with another type of oxirane compound represented by general formula (XIV) or an alkylene oxide having 2 to 8 carbon atoms which is represented by general formula (XV). In this process, the two types of the reaction can be conducted continuously in a single reactor.

(Z) Process

The aimed polyoxyalkylene glycol derivative can be produced by obtaining a polyoxyalkylene glycol by polymerization of an alkylene oxide having 2 to 8 carbon atoms which is represented by general formula (XX), followed by polymerizing the obtained polyoxyalkylene glycol with an oxirane compound represented by general formula (XIX) or with an oxirane compound represented by general formula (XIX) and an alkylene oxide represented by general formula (XX). In this process, the two types of the reaction can be conducted continuously in a single reactor.

Further improvements in the properties as the oil for refrigerators such as improvement in solubility, decrease in hygroscopicity, improvement in the viscosity index and improvement in the lubricity can be achieved by converting entire hydroxyl groups or a portion of hydroxyl groups at the chain ends of the polyoxyalkylene glycol derivative obtained in accordance with processes (X) to (Z) into esters or ethers. It is preferable that the hydrocarbon group in the residue group of the ester or the ether has 1 to 10 carbon atoms.

In lubricating oil for refrigerators (B-1) as the second aspect of the present invention, the above polyoxyalkylene glycol derivative used as the main component of the base oil has a kinematic viscosity at 40° C. in the range of 3 to 2,000 mm$^2$/s, preferably in the range of 3 to 500 mm$^2$/s, more preferably in the range of 3 to 300 mm$^2$/s and most preferably in the range of 5 to 200 mm$^2$/s.

Lubricating oils for refrigerators (B-2) and (B-3) as the second aspect of the present invention will be described in the following.

Lubricating oil for refrigerators (B-2) as the second aspect of the present invention comprises, as the base oil, (a) a polyvinyl ether-based derivative with a kinematic viscosity of 3 to 500 mm$^2$/s at 40° C. and (b) a polyoxyalkylene glycol derivative with a kinematic viscosity of 3 to 2,000 mm$^2$/s at 40° C. in an amount of 0.1% by weight or more and less than 60% by weight based on an amount of the entire base oil, and having at least one constituting unit represented by the general formula (III).

As the polyvinyl ether-based derivative used as component (a) of the base oil in lubricating oil for refrigerators (B-2) as the second aspect of the present invention, the same polyvinyl ether-based derivatives as those described for component (a) of the base oil in lubricating oil for refrigerators (A-1) as the first aspect of the present invention is used.

Lubricating oil for refrigerators (B-3) as the second aspect of the present invention comprises, as the base oil, (a) a polyester-based derivative with a kinematic viscosity of 3 to 500 mm$^2$/s at 40° C. and (b) a polyoxyalkylene glycol derivative with a kinematic viscosity of 3 to 2,000 mm$^2$/s at 40° C. in an amount of 0.1% by weight or more and less than 60% by weight based on an amount of the entire base oil, having at least one constituting unit represented by the general formula (III).

As the polyester-based derivative used as component (a) of the base oil in lubricating oil for refrigerators (B-3) as the second aspect of the present invention, the same polyvinyl ether-based derivatives as those described for component (a) of the base oil in lubricating oil for refrigerators (A-1) as the first aspect of the present invention.

The above lubricating oils for refrigerators are miscible with a refrigerant having one carbon atom and no chlorine atoms such as R32 (which means that the liquid phase is homogeneous) at a temperature of 5° C. or lower for (B-2) and at a temperature of 10° C. or lower for (B-3) in at least any one of the case where the lubricating oil is contained within the range of 3 to 50% by weight based on the amount of the entire mixture comprising the lubricating oil and the refrigerant. The content of the lubricating oil exhibiting the miscibility with the refrigerant at a temperature of 5° C. or lower for (B-2) or at a temperature of 10° C. or lower for (B-3) is within the range of 3 to 50% by weight as described above. It is preferable that the range is 10 to 15% by weight. It is more preferable that the lubricating oil is miscible with the refrigerant in the entire range of the content of 3 to 50% by weight. When the temperature exhibiting the miscibility, i.e., the temperature of phase separation at the low temperature side, exceeds 5° C. for (B-2) or 10° C. for (B-3), there is the anxiety that phase separation takes place during the operation of refrigeration. When the phase separation takes place during the operation of refrigeration, the lifetime and the efficiency of the apparatus are adversely affected to a great extent. For example, when the phase separation of the refrigerant and the lubricating oil takes place in the compressor, lubrication of moving parts deteriorates and seizure occurs to cause a great decrease in the lifetime of the apparatus. When the phase separation takes places in the evaporator, the efficiency of heat exchange decreases due to the presence of lubricating oil of high viscosity.

Based on the above reasons, it is necessary that the maximum temperature in the area of phase separation at the low temperature side is 5° C. or lower for (B-2) and 10° C. or lower for (B-3). It is preferable that the maximum temperature is 3° C. or lower and 8° C. or lower, respectively, more preferably 0° C. or lower and 5° C. or lower, respectively, and most preferably −2° C. or lower or 2° C. or lower, respectively.

As component (b) of the base oil in (B-2) and (B-3), the same polyoxyalkylene glycol derivatives as those described for the main component of the base oil in lubricating oil for refrigerators (B-1) are used. The polyoxyalkylene glycol derivative has a kinematic viscosity at 40° C. in the range of 3 to 2,000 mm$^2$/s, preferably in the range of 3 to 500 mm$^2$/s, more preferably in the range of 3 to 300 mm$^2$/s and most preferably in the range of 5 to 200 mm$^2$/s.

It is preferable that the base oil in the lubricating oil for refrigerators as the second aspect of the present invention has a kinematic viscosity in the range of 7 to 200 mm$^2$/s and more preferably in the range of 8 to 150 mm$^2$/s and a viscosity index of 40 or greater, more preferably in the range of 50 to 130 and most preferably in the range of 60 to 120.

It is preferable that the lubricating oils for refrigerators as the first aspect and the second aspect of the present invention further comprise acid catchers, extreme pressure agents, oiliness agents and antioxidants.

Examples of the acid catcher include compounds having glycidyl ether group, epoxidized monoesters of fatty acids, epoxidized oils and fats and compounds having epoxycycloalkyl group. Examples of the extreme pressure agent include organic sulfur compound-based agents such as monosulfides, polysulfides, sulfoxides, sulfones, thiosulfinates, vulcanized oils and fats, thiocarbonates, thiophenes, thiazoles and esters of methanesulfonic acid; phosphoric acid ester-based agents such as monoesters of phosphoric acid, diesters of phosphoric acid and triesters of phosphoric acid such as tricresyl phosphate; phosphorous acid ester-based agents such as monoesters of phosphorous acid, diesters of phosphorous acid and triesters of phosphorous acid; thiophosphoric acid ester-based agents such as triesters of thiophosphoric acid; higher fatty acid-based agents; hydroxyaryl fatty acid-based agents; ester-based agents such as esters of polyhydric alcohols and esters of acrylic acid; organic chlorine compound-based agents such as chlorinated hydrocarbons and chlorinated derivatives of carboxylic acids; organic fluorine compound-based agents such as fluorinated aliphatic carboxylic acids, fluorinated ethylene resins, fluorinated alkylpolysiloxanes and fluorinated graphite; alcohol-based agents such as higher alcohols; naphthenic acid salt-based agents such as lead naphthenate; fatty acid salt-based agents such as lead salts of fatty acids; thiophosphoric acid salt-based agents such as zinc dialkyl-dithiophosphates; thiocarbamic aid salt-based agents; and metal compound-based agents such as organomolybdenum compounds, organotin compounds, organogermanium compounds and esters of boric acid. Examples of the antioxidant include phenol-based antioxidants such as 2,6-di-tert-butyl-p-cresol and amine-based antioxidants such as α-naphthylamine.

Preferable examples of the oiliness agent include (x) compounds obtained by etherification of aliphatic polyhydric alcohols having a functionality of 3 to 6 and (y) compounds obtained by etherification of condensates of two or three molecules of aliphatic polyhydric alcohols having a functionality of 3 to 6.

The above component (x) and component (y) will be described in the following. As the compound obtained by etherification of an aliphatic polyhydric alcohol having a functionality of 3 to 6 of component (x), compounds represented by the following general formulae (XVIII-a) to (XVIII-f) are preferable:

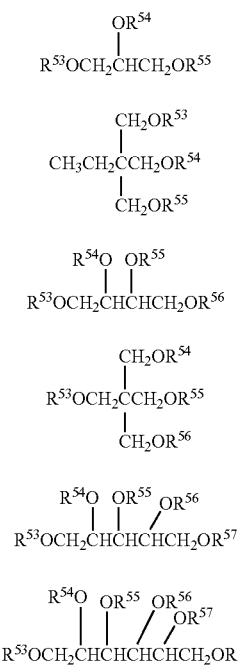
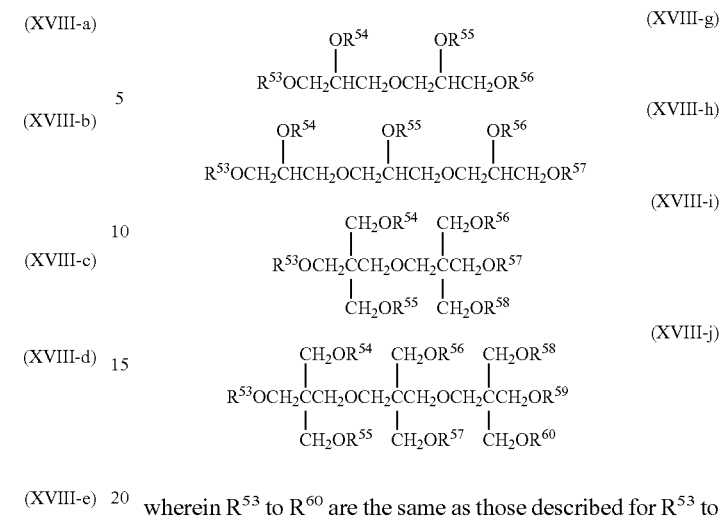

wherein $R^{53}$ to $R^{58}$ each represent hydrogen atom or an alkyl group, an aryl group or an aralkyl group which has 1 to 18 carbon atoms and may be linear or branched. The atoms or the groups represented by $R^{53}$ to $R^{58}$ may be the same with or different from each other. $R^{53}$ to $R^{58}$ may each represent a glycol ether residue group represented by —$(R^a O)_x$—$R^b$, wherein $R^a$ represents an alkylene group having 2 to 6 carbon atoms, $R^b$ represents an alkyl group, an aryl group or an aralkyl group which has 1 to 20 carbon atoms and x represents an integer of 1 to 10.

Examples of the aliphatic polyhydric alcohol having a functionality of 3 to 6 include glycerol, trimethylolpropane, erythritol, pentaerythritol, arabitol, sorbitol and mannitol. Examples of the group represented by $R^{53}$ to $R^{58}$ in the general formulae (XVIII-a) to (XVIII-f) include methyl group, ethyl group, n-propyl group, isopropyl group, various types of butyl group, various types of pentyl group, various types of hexyl group, various types of heptyl group, various types of octyl group, various types of nonyl group, various types of decyl group, various types of undecyl group, various types of dodecyl group, various types of tridecyl group, various types of tetradecyl group, various types of pentadecyl group, various types of hexadecy group, various types of heptadecyl group, various types of octadecyl group, phenyl group and benzyl group. $R^{53}$ to $R^{58}$ may also represent hydrogen atom and, in this case, the above compound is a partial ether.

As for the compound obtained by etherification of a condensate of two or three molecules of aliphatic polyhydric alcohols having a functionality of 3 to 6 of component (y), for example, compounds obtained by etherification of alcohols corresponding to general formula (XVIII-a) are represented by general formulae (XVIII-g) and (XVIII-h) and compounds obtained by etherification of alcohols corresponding to general formula (XVIII-d) are represented by general formulae (XVIII-i) and (XVIII-j):

wherein $R^{53}$ to $R^{60}$ are the same as those described for $R^{53}$ to $R^{58}$ and the atoms or groups represented by $R^{53}$ to $R^{60}$ may be the same with or different from each other.

Examples of the condensate of two or three molecules of an aliphatic polyhydric alcohols having a functionality of 3 to 6 include diglycerol, ditrimethylolpropane, dipentaerythritol, disorbitol, triglycerol, tritrimethylolpropane, tripentaerythritol and trisorbitol.

Examples of components (x) and (y) represented by the general formulae (XVIII-a) to (XVIII-j) include trihexyl ether of glycerol, dimethyl octyl triether of glycerol, di(methyloxyisopropylene) dodecyl triether of glycerol, diphenyl octyl triether of glycerol, di(phenyloxy-isopropylene) dodecyl triether of glycerol, trihexyl ether of trimethylol-propane, dimethyl octyl triether of trimethylolpropane, di(methyloxy-isopropylene) dodecyl triether of trimethylolpropane, tetrahexyl ether of pentaerythritol, trimethyl octyl tetraether of pentaerythritol, tri(methyloxyisopropylene) dodecyl tetraether of pentaerythritol, hexapropyl ether of sorbitol, tetramethyl octyl pentaether of sorbitol, hexa(methyloxyisopropylene) ether of sorbitol, tetrabutyl ether of diglycerol, dimethyl dioctyl tetraether of diglycerol, tri(methyloxy-isopropylene) dodecyl tetraether of diglycerol, pentaethyl ether of triglycerol, trimethyl dioctyl pentaether of triglycerol, tetra(methyloxy-isopropylene) decyl pentaether of triglycerol, tetrabutyl ether of ditrimethylolpropane, dimethyl dioctyl tetraether of ditrimethylolpropane, tri(methyloxyisopropylene) dodecyl tetraether of ditrimethylolpropane, pentaethyl ether of tritrimethylolpropane, trimethyl dioctyl pentaether of tritrimethylolpropane, tetra(methyloxyisopropylene) decyl pentaether of tritrimethylolpropane, hexapropyl ether of dipentaerythritol, pentamethyl octyl hexaether of dipentaerythritol, hexa(methyloxyisopropylene) ether of dipentaerythritol, octapropyl ether of tripentaerythritol, pentamethyl octyl hexaether of tripentaerythritol, hexa(methyloxyisopropylene) ether of tripentaerythritol, octamethyl dioctyl decaether of disorbitol and deca(methyloxyisopropylene) ether of disorbitol. Among these compounds, diphenyl octyl triether of glycerol, di(methyloxyisopropylene) dodecyl triether of trimethylolpropane, tetrahexyl ether of pentaerythritol, hexapropyl ether of sorbitol, dimethyl dioctyl tetraether of diglycerol, tetra(methyloxyisopropylene) decyl pentaether of triglycerol, hexapropyl ether of pentaerythritol and pentamethyl octyl hexaether of tripentaerythritol are preferable.

The kinematic viscosity of components (x) and (y) at 40° C. is in the range of 5 to 200 mm²/s and preferably in the range of 10 to 100 mm²/s. When the kinematic viscosity is smaller than 5 mm²/s, the effect of improving the lubricity and preventing clogging of capillaries is small. When the kinematic viscosity exceeds 200 mm²/s, it is unfavorable because the miscibility with the refrigerant decreases (i.e., the temperature of phase separation is elevated). In the lubricating oil composition for refrigerators of the present invention, the above components (x) and (y) may be used singly or in combination of two or more. It is preferable that the amount of components (x) and (y) are in the range of 0.1 to 30% by weight based on the amount of the entire composition. When the amount is less than 1% by weight, the object of the present invention is not sufficiently achieved. When the amount exceeds 30% by weight, the effect is not exhibited to the degree expected from the amount and solubility into the base oil occasionally decreases. It is more preferable that the amount is in the range of 0.1 to 15% by weight and most preferably in the range of 0.5 to 10% by weight.

The lubricating oil for refrigerators of the present invention may further comprise other additives conventionally used for lubricating oils such as metal inactivators, defoaming agents, detergent dispersants, viscosity index improvers, antiwear additives, rust preventives, corrosion inhibitors and pour pint improvers, where desired.

Examples of the metal inactivator include benzotriazole derivatives. Examples of the defoaming agent include silicone oils such a dimethylpolysiloxane and polymethacrylates. Examples of the detergent dispersant include sulfonates, phenates and succinimide. Examples of the viscosity index improver include polymethacrylates, polyisobutylene, ethylene-propylene copolymers and hydrogenated styrene-diene copolymers.

The hydraulic fluid composition for refrigerators of the present invention comprises (A) a refrigerant having one carbon atom and no chlorine atoms and (B) a lubricating oil for refrigerators of the present invention described above.

Examples of the refrigerant having one carbon atom and no chlorine atoms include difluoromethane (R32). The amounts of component (A) and component (B) are selected in a manner such that the ratio of the amount by weight of component (A) to the amount by weight of component (B) is, in general, in the range of 5:95 to 99:1 and preferably in the range of 10:90 to 99:1. When the amount of the refrigerant is smaller than the above range, the refrigerating ability decreases. When the amount of the refrigerant exceeds the above range, the lubricity decreases. Therefore, such amounts are not preferable.

The lubricating oil for refrigerators of the present invention can be applied to various types of refrigerators. In particular, the lubricating oil for refrigerators of the present invention is advantageously applied to compression-type refrigerating cycles of compression-type refrigerators. For example, the lubricating oil can be advantageously applied to refrigerators disclosed in Japanese Patent Application Laid-Open Nos. Heisei 4(1992)-183788, Heisei 8(1996)-259975, Heisei 8(1996)-240362, Heisei 8(1996)-253779, Heisei 8(1996)-240352, Heisei 5(1993)-17792, Heisei 8(1996)-226717 and Heisei 8(1996)-231972. For example, the advantageous effects can be exhibited when the lubricating oil of the present invention is applied to compression-type refrigerating cycles having an oil separator and/or a hot gas line such as the refrigerating cycles shown in FIGS. 1 to 3.

Figure 2:
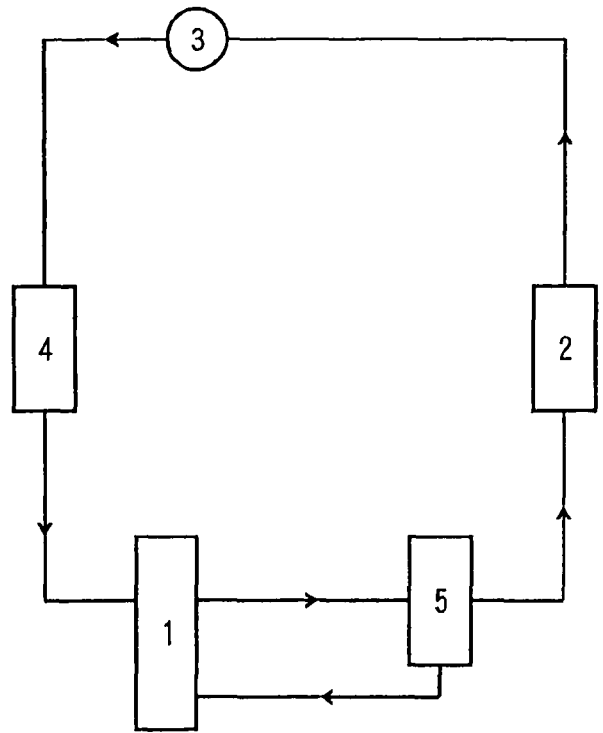
FIG. 2 shows a flow diagram that exhibits an example of the compression type refrigerating cycle of the "compressor-condenser-expansion valve-evaporator" system having an oil separator.
Figure 3:
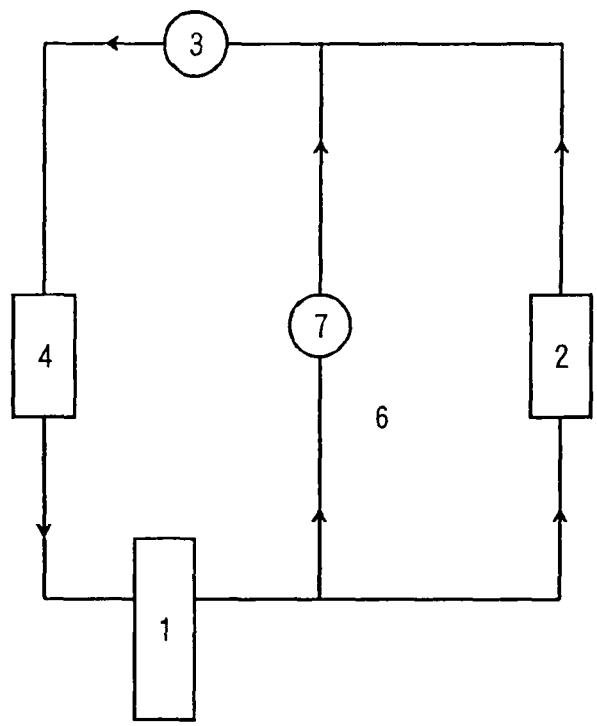
FIG. 3 shows a flow diagram that exhibits an example of the compression type refrigerating cycle of the "compressor-condenser-expansion valve-evaporator" system having a hot gas line.
Figure 4:
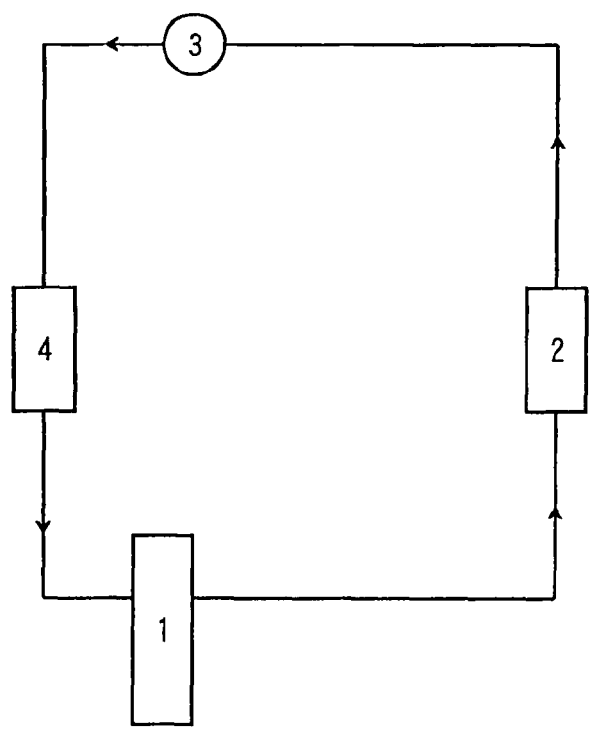
FIG. 4 shows a flow diagram which exhibits an example of the compression type refrigerating cycle of the "compressor-condenser-expansion valve-evaporator" system.

FIG. 1 shows a flow diagram that exhibits an example of the compression type refrigerating cycle of the "compressor-condenser-expansion valve-evaporator" system having an oil separator and a hot gas line. FIG. 2 shows a flow diagram that exhibits an example of the compression type refrigerating cycle of the "compressor-condenser-expansion valve-evaporator" system having an oil separator. FIG. 3 shows a flow diagram that exhibits an example of the compression type refrigerating cycle of the "compressor-condenser-expansion valve-evaporator" system having a hot gas line. In the Figures, numerical symbol 1 means a compressor, numerical symbol 2 means a condenser, numerical symbol 3 means an expansion valve, numerical symbol 4 means an evaporator, numerical symbol 5 means an oil separator, numerical symbol 6 means a hot gas line and numerical symbol 7 means a valve for a hot gas line. In general, a compression-type refrigerating cycle comprises a compressor, a condenser, an expansion valve and an evaporator as shown in FIG. 4. As the lubricating oil for a refrigerator, a lubricating oil exhibiting excellent miscibility with the refrigerant used for the refrigerator is used. However, when a refrigerant comprising component (A) as the main component is used for the above refrigerating cycle and the refrigerator is lubricated with a conventional refrigerating oil, antiwear is poor and a stable operation for a long period time cannot be achieved due to insufficient stability. In particular, the drawbacks are marked when a capillary tube is used as the expansion valve in the refrigerating cycle of a refrigerator such as an electric refrigerator and a small air conditioner. The lubricating oil of the present invention can be effectively used as the lubricating oil composition even when a compression-type refrigerating cycle having an oil separator and/or a hot gas line is operated using a refrigerant comprising component (A) as the main component.

The hydraulic fluid composition for refrigerators of the present invention exhibits remarkably excellent miscibility between component (A) and component (B). The maximum temperature in the area of phase separation at the low temperature side is 5° C. or lower, more preferably 3° C. or lower, still more preferably 0° C. or lower and most preferably −2° C. or lower.

The hydraulic fluid composition of the present invention does not cause phase separation at the low temperature side during operation of the refrigerator since the maximum temperature in the area of phase separation at the low temperature side is low and enables stable operation of the refrigerator.

EXAMPLES

The present invention will be described more specifically with reference to examples in the following. However, the present invention is not limited to the examples.

The kinematic viscosity and the viscosity index of a base oil and the properties of a lubricating oil were evaluated in accordance with the following methods.
<Base Oil>
(1) Kinematic Viscosity The kinematic viscosity was measured in accordance with the method of Japanese Industrial Standard K2283-1983 using a glass capillary viscometer at 40° C. and at 100° C.
<Lubricating Oil>
(2) Kinematic Viscosity The kinematic viscosity was measured in accordance with the method of Japanese Industrial Standard K2283-1983 using a glass capillary viscometer at 40° C.
(3) Test of Miscibility A prescribed amount of a sample was placed into a pressure-resistance glass ampoule. The glass ampoule was connected to a vacuum piping and a piping of the refrigerant of difluoromethane (R32). After the ampoule was evacuated to remove gasses at the room temperature, the ampoule was cooled and a prescribed amount of the refrigerant of difluoromethane (R32) was taken into the ampoule. Then, the ampoule was sealed. To examine the miscibility at the low temperature side, the ampoule was cooled slowly from the room temperature to −50° C. in a thermostatted chamber and the temperature at which the phase separation started was measured. The lower the temperature of phase separation, the more preferable the property at the low temperature side.

(4) Lubricity

The load of seizure was obtained in accordance with the method of ASTM D-3233 using a Falex friction tester of the closed type. The condition of the test was as follows: the amount of oil: 300 ml; the refrigerant: R32; the pressure: 0.8 MPaG; and the temperature: 50° C.

(5) Stability (Autoclave Test)

Into an autoclave having an inner volume of 200 ml, 40 g of a sample oil, 40 g of the refrigerant of R32 gas and a metal catalyst containing copper, aluminum and iron were placed and water was added to the system in an amount such that the content of water in the system was adjusted to 2,000 ppm. After the autoclave was closed and kept at 175° C. for 21 days, the sample of the lubricating oil was analyzed.

Preparation Example 1

In a four-necked glass flask having a capacity of 1 liter and equipped with a stirrer, a thermometer, an inlet for nitrogen and a distillation head for concentrating the distillate, 360.6 g (4.0 moles) of dimethyl carbonate, 268.8 g (2.0 moles) of dipropylene glycol and 3.9 g (0.02 moles) of a 28% by weight methanol solution of sodium methoxide as the catalyst were placed and the resultant mixture was heated at 120° C. for 5 hours in an oil bath while nitrogen gas was passed at a rate of 50 ml/minute. When distillation of methanol did not take place any more, the heating was stopped and 500 ml of toluene was added to the mixture. The obtained toluene solution of the product was washed with 300 ml of pure water and the washing water was not alkaline after the washing was repeated five times. Toluene was completely removed by distillation using a rotary evaporator under evacuation by an aspirator at 120° C. for 30 minutes, followed by evacuation by a vacuum pump at 133 Pa for 30 minutes and 295 g of a polycarbonate of dipropylene glycol (methyl group at the chain ends) of the aimed compound expressed as:

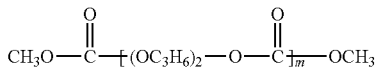

was obtained. This compound will be referred to as PC-1.

Preparation Example 2

In accordance with the same procedures as those conducted in Preparation Example 1 except that 236.3 g (2.0 moles) of 3-methyl-1,5-pentanediol was used in stead of 268.8 g of dipropylene glycol, 255 g of a polycarbonate of 3-methyl-1,5-pentanediol (methyl group at the chain ends) of the aimed compound expressed as:

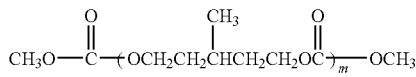

was obtained. This compound will be referred to as PC-2.

In Table 1, the kinematic viscosity and the viscosity index of PC-1 and PC-2 obtained above are shown together with the corresponding data of PVE-1, PVE-2 and PVE-3.

TABLE 1

| Sample | Kinematic viscosity at 40° C. (mm²/s) | Kinematic viscosity at 100° C. (mm²/s) | Viscosity index |
|---|---|---|---|
| PVE-1 | 70.33 | 8.20 | 85 |
| PVE-2 | 33.74 | 5.21 | 76 |
| PVE-3 | 70.71 | 8.51 | 88 |
| PC-1 | 141.7 | 10.30 | 20 |
| PC-2 | 88.47 | 11.15 | 113 |

Notes:
PVE-1 Copolymer [ethyl vinyl ether/isobutyl vinyl ether (ratio by mole: 9/1)]
PVE-2 Copolymer [ethyl vinyl ether/isobutyl vinyl ether (ratio by mole: 8/2)]
PVE-3 Polyethyl vinyl ether
PC-1 Polycarbonate obtained in Preparation Example 1
PC-2 Polycarbonate obtained in Preparation Example 2

Preparation Example 3

With reference to the process described in Japanese Examined Patent Application Publication Heisei 7(1995)-119430, polyoxyalkylene glycol derivatives MIPPO-1 and MIPPO-2 were prepared.

MIPPO-1: poly[methoxyisopropoxypropylene oxide] (methyl groups at both chain ends)

MIPPO-2: copoly[methoxyisopropoxypropylene oxide/ethylene oxide] (methyl groups at both chain ends)

In Table 2, the kinematic viscosity and the viscosity index of MIPPO-1 and MIPPO-2 obtained above are shown together with the corresponding data of POE-1, POE-2 and POE-3.

TABLE 2

| Sample | Kinematic viscosity at 40° C. (mm²/s) | Kinematic viscosity at 100° C. (mm²/s) | Viscosity index |
|---|---|---|---|
| POE-1 | 67.90 | 8.27 | 98 |
| POE-2 | 50.20 | 6.98 | 94 |
| POE-3 | 31.40 | 5.23 | 95 |
| MIPPO-1 | 130.50 | 20.05 | 177 |
| MIPPO-2 | 68.70 | 12.62 | 186 |

Notes:
POE-1 Complete ester from pentaerythritol and 2-ethylhexanoic acid/3,5,5-trimethylhexanoic acid (ratio by mole: 0.5/0.5)
POE-2 Complete ester from trimethylolpropane and 3,5,5-trimethylhexanoic acid
POE-3 Complete ester from pentaerythritol and 2-ethylhexanoic acid/2-methylhexanoic acid (ratio by mole: 0.5/0.5)
MIPPO-1 Poly[methoxyisopropoxypropylene oxide] (methyl groups at both chain ends)
MIPPO-2 Copolymer [methoxyisopropoxypropylene oxide/ethylene oxide] (methyl groups at both chain ends)

Examples 1 to 5

Base oil (a) and base oil (b) shown in Table 3 are mixed in relative amounts also shown in Table 3 to prepare lubricating oils and the properties of the prepared lubricating oils were evaluated. The results are shown in Table 3.

Comparative Examples 1 to 3

The properties of lubricating oils composed of a polyvinyl ether alone shown in Table 3 were evaluated. The results are shown in Table 3.

TABLE 3

|  | Example | | | | | Comparative Example | | |
|---|---|---|---|---|---|---|---|---|
|  | 1 | 2 | 3 | 4 | 5 | 1 | 2 | 3 |
| Base oil (a) | | | | | | | | |
| type | PVE-1 | PVE-1 | PVE-2 | PVE-3 | PVE-3 | PVE-1 | PVE-2 | PVE-3 |
| amount (% by wt.) | 90 | 80 | 90 | 95 | 85 | 100 | 100 | 100 |
| Base oil (b) | | | | | | | | |
| type | PC-1 | PC-2 | PC-1 | PC-1 | PC-2 | — | — | — |
| amount (% by wt.) | 10 | 20 | 10 | 5 | 15 | — | — | — |
| Kinematic viscosity at 40° C. (mm$^2$/s) | 75.09 | 73.57 | 38.18 | 73.04 | 73.08 | 70.33 | 33.74 | 70.71 |
| Temperature of phase separation (° C.) | | | | | | | | |
| 15% by weight | 0 | −4 | −2 | −3 | −9 | separation | 23 | 10 |
| 20% by weight | −8 | −12 | −16 | −10 | −18 | separation | 21 | 8 |
| Autoclave test | | | | | | | | |
| appearance of oil | good | good | good | good | good | good | good | good |
| precipitates | none | none | none | none | none | none | none | none |
| metal catalyst | no change | no change | no change | no change | no change | no change | no change | no change |
| Lubricity [load of seizure] (N) | 3550 | 3670 | 3210 | 3470 | 3500 | 3180 | 2890 | 3190 |

Note:
In the temperature of phase separation, % by weight shows the following value:
[sample/(sample + R32)] × 100 (Similarly, in the following Tables)

Examples 6 to 10

Base oil (a) and base oil (b) shown in Table 4 are mixed in relative amounts also shown in Table 4 to prepare lubricating oils and the properties of the prepared lubricating oils were evaluated. The results are shown in Table 4.

Comparative Examples 4 to 6

The properties of lubricating oils composed of a polyester alone shown in Table 4 were evaluated. The results are shown in Table 4.

TABLE 4

|  | Example | | | | | Comparative Example | | |
|---|---|---|---|---|---|---|---|---|
|  | 6 | 7 | 8 | 9 | 10 | 4 | 5 | 6 |
| Base oil (a) | | | | | | | | |
| type | POE-1 | POE-1 | POE-2 | POE-3 | POE-3 | POE-1 | POE-2 | POE-3 |
| amount (% by wt.) | 90 | 80 | 90 | 95 | 85 | 100 | 100 | 100 |
| Base oil (b) | | | | | | | | |
| type | PC-1 | PC-2 | PC-1 | PC-1 | PC-2 | — | — | — |
| amount (% by wt.) | 10 | 20 | 10 | 5 | 15 | — | — | — |
| Kinematic viscosity at 40° C. (mm$^2$/s) | 72.7 | 71.5 | 55.1 | 35.5 | 36.1 | 67.9 | 50.2 | 31.4 |
| Temperature of phase separation (° C.) | | | | | | | | |
| 15% by weight | 5 | 10 | 2 | −5 | −8 | separation | separation | 15 |
| 20% by weight | −2 | 0 | −8 | −9 | −15 | separation | separation | 12 |
| Autoclave test | | | | | | | | |
| appearance of oil | good | good | good | good | good | light yellow | light yellow | light yellow |
| precipitates | none | none | none | none | none | none | none | none |
| metal catalyst | no change | no change | no change | no change | no change | no change | no change | no change |
| Lubricity [load of seizure] (N) | 3780 | 3880 | 3640 | 3600 | 3490 | 3690 | 3580 | 3720 |

Examples 11 to 17

Base oil (a) and base oil (b) shown in Table 5 are mixed in relative amounts also shown in Table 5 to prepare lubricating oils and the properties of the prepared lubricating oils were evaluated. The results are shown in Table 5.

TABLE 5

| Example | 11 | 12 | 13 | 14 | 15 | 16 | 17 |
|---|---|---|---|---|---|---|---|
| Base oil (a) | | | | | | | |
| type | PVE-1 | PVE-1 | PVE-2 | PVE-3 | PVE-3 | — | — |
| amount (% by wt.) | 80 | 70 | 90 | 95 | 85 | — | — |
| Base oil (b) | | | | | | | |
| type | MIPPO-2 | MIPPO-1 | MIPPO-1 | MIPPO-1 | MIPPO-2 | MIPPO-1 | MIPPO-2 |
| amount (% by wt.) | 20 | 30 | 10 | 5 | 15 | 100 | 100 |
| Kinematic viscosity at 40° C. (mm²/s) | 70.0 | 83.96 | 37.95 | 72.28 | 70.40 | 130.5 | 68.7 |
| Temperature of phase separation (° C.) | | | | | | | |
| 15% by weight | 4 | 0 | −34 | −1 | −32 | −50> | −50> |
| 20% by weight | 0 | −3 | −38 | −4 | −36 | −50> | −50> |
| Autoclave test | | | | | | | |
| appearance of oil | good | good | good | good | good | good | good |
| precipitates | none | none | none | none | none | none | none |
| metal catalyst | no change | no change | no change | no change | no change | no change | no change |
| Lubricity [load of seizure] (N) | 3650 | 3910 | 3330 | 3760 | 3900 | 4220 | 3910 |

Examples 18 to 22

Base oil (a) and base oil (b) shown in Table 6 are mixed in relative amounts also shown in Table 6 to prepare lubricating oils and the properties of the prepared lubricating oils were evaluated. The results are shown in Table 6.

TABLE 6

| Example | 18 | 19 | 20 | 21 | 22 |
|---|---|---|---|---|---|
| Base oil (a) | | | | | |
| type | POE-1 | POE-1 | POE-2 | POE-3 | POE-3 |
| amount (% by wt.) | 90 | 80 | 90 | 90 | 80 |
| Base oil (b) | | | | | |
| type | MIPPO-1 | MIPPO-2 | MIPPO-1 | MIPPO-1 | MIPPO-2 |
| amount (% by wt.) | 10 | 20 | 10 | 10 | 20 |
| Kinematic viscosity at 40° C. (mm²/s) | 72.20 | 68.06 | 54.76 | 35.50 | 36.30 |
| Temperature of phase separation (° C.) | | | | | |
| 15% by weight | 10 | 5 | 7 | 2 | −1 |
| 20% by weight | 2 | −3 | 0 | −5 | −12 |
| Autoclave test | | | | | |
| appearance of oil | good | good | good | good | good |
| precipitates | none | none | none | none | none |
| metal catalyst | no change | no change | no change | no change | no change |
| Lubricity [load of seizure] (N) | 3810 | 3930 | 3690 | 3880 | 4020 |

INDUSTRIAL APPLICABILITY

The lubricating oil for refrigerators of the present invention exhibits excellent miscibility with a refrigerant having one carbon atom and no chlorine atoms and, in particular, with difluoromethane.

The hydraulic fluid composition for refrigerators of the present invention comprising the lubricating oil for refrigerators and the refrigerant of the present invention exhibits excellent antiwear, lubricity and stability.

The invention claimed is:

1. A hydraulic fluid composition which comprises (A) a refrigerant consisting of difluoromethane and (B) a lubricating oil which comprises, as a base oil, a polyoxyalkylene glycol derivative with a kinematic viscosity of 3 to 2,000 mm²/s at 40° C. and, as a main component thereof, having at least one constituting unit represented by general formula (III):

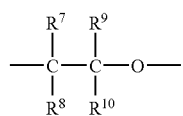

wherein $R^7$ to $R^{10}$ each independently represent hydrogen atom, a monovalent hydrocarbon group having 1 to 10 carbon atoms or a group represented by general formula (IV):

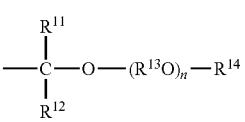

wherein $R^{11}$ and $R^{12}$ each independently representing hydrogen atom, a monovalent hydrocarbon group having 1 to 20 carbon atoms or an alkoxyalkyl group having 2 to 20 carbon atoms, $R^{13}$ representing an alkylene group having 2 to 5 carbon atoms, a substituted alkylene group having an alkyl group as a substituent and 2 to 5 carbon atoms in an entire group or a substituted alkylene group having an alkoxyalkyl group as a substituent and 4 to 10 carbon atoms in an entire group, $R^{14}$ representing a monovalent hydrocarbon group having 1 to 10 carbon atoms and n representing an integer of 0 to 20; and at least one of $R^7$ to $R^{10}$ represents a group represented by general formula (IV).

2. The hydraulic fluid according to claim 1, wherein a kinematic viscosity at 40° C. of said lubricating oil is 7 to 200 mm²/s and a viscosity index of said lubricating oil is 40 or greater.

3. The hydraulic fluid according to claim 1, which further comprises an acid catcher.

4. The hydraulic fluid according to claim 1, which further comprises at least one additive selected from a group consisting of extreme pressure agents, oiliness agents and antioxidants.

5. The hydraulic fluid composition according to claim 1, which comprises said (A) and said (B) in amounts such that a ratio of an amount by weight of said (A) to an amount by weight of said (B) is in a range of 5:95 to 99:1.

6. The hydraulic fluid according to claim 1, wherein one of $R^7$ and $R^9$ represents a group represented by the general formula (IV), and the other of $R^7$ and $R^9$, $R^8$ and $R^{10}$ each represents a hydrogen atom or a monovalent hydrocarbon group having 1 to 10 carbon atoms.

7. The hydraulic fluid according to claim 1, wherein the polyalkylene glycol derivative is a homopolymer comprising constituting units represented by the general formula (III).

8. The hydraulic fluid according to claim 1, wherein the polyalkylene glycol derivative is a copolymer comprising two or more different constituting units represented by the general formula (III).

9. The hydraulic fluid according to claim 1, wherein the polyalkylene glycol derivative is a copolymer comprising constituting units represented by the general formula (III) and other constituting units represented by general formula (XVIII):

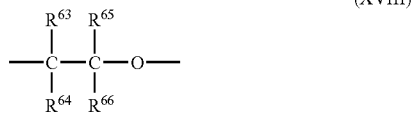

(XVIII)

wherein $R^{63}$ to $R^{66}$ each represent hydrogen atom or an alkyl group having 1 to 3 carbon atoms.

10. The hydraulic fluid according to claim 7, wherein the homopolymer comprises 1 to 200 constituting units A represented by the general formula (III) and having an hydroxyl group, an acyloxyl group having 1 to 10 carbon atoms, an alkoxyl group having 1 to 10 carbon atoms or an aryloxyl group at each chain end.

11. The hydraulic fluid according to claim 8, wherein the copolymer comprises two constituting units A and B each represented by the general formula (III) each in a number of 1 to 200, and having an hydroxyl group, an acyloxyl group having 1 to 10 carbon atoms, an alkoxyl group having 1 to 10 carbon atoms or an aryloxyl group at each chain end.

12. The hydraulic fluid according to claim 9, wherein the copolymer comprises 1 to 200 constituting units A represented by general formula (III) and 1 to 200 constituting units C represented by general formula (XVIII), and having an hydroxyl group, an acyloxyl group having 1 to 10 carbon atoms, an alkoxyl group having 1 to 10 carbon atoms or an aryloxyl groups at each chain end.

13. The hydraulic fluid according to claim 6, wherein the polyalkylene glycol derivative is a homopolymer comprising constituting units represented by the general formula (III).

14. The hydraulic fluid according to claim 6, wherein the polyalkylene glycol derivative is a copolymer comprising two or more different constituting units represented by the general formula (III).

15. The hydraulic fluid according to claim 6, wherein the polyalkylene glycol derivative is a copolymer comprising constituting units represented by the general formula (III) and other constituting units represented by general formula (XVIII):

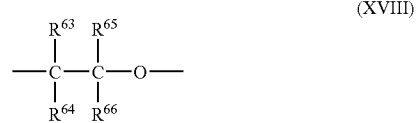

(XVIII)

wherein $R^{63}$ to $R^{66}$ each represent hydrogen atom or an alkyl group having 1 to 3 carbon atoms.

16. The hydraulic fluid according to claim 13, wherein the homopolymer comprises 1 to 200 constituting units A represented by the general formula (III) and having an hydroxyl group, an acyloxyl group having 1 to 10 carbon atoms, an alkoxyl group having 1 to 10 carbon atoms or an aryloxyl group at each chain end.

17. The hydraulic fluid according to claim 14, wherein the copolymer comprises two constituting units A and B each represented by the general formula (III) each in a number of 1 to 200, and having an hydroxyl group, an acyloxyl group having 1 to 10 carbon atoms, an alkoxyl group having 1 to 10 carbon atoms or an aryloxyl group at each chain end.

18. The hydraulic fluid according to claim 15, wherein the copolymer comprises 1 to 200 constituting units A represented by general formula (III) and 1 to 200 constituting units C represented by general formula (XVIII), and having an hydroxyl group, an acyloxyl group having 1 to 10 carbon atoms, an alkoxyl group having 1 to 10 carbon atoms or an aryloxyl groups at each chain end.

* * * * *